United States Patent
Park et al.

(10) Patent No.: US 8,743,771 B2
(45) Date of Patent: Jun. 3, 2014

(54) METHOD FOR ENABLING RELAY NODE TO TRANSMIT UPLINK CONTROL INFORMATION IN WIRELESS COMMUNICATION SYSTEM AND THE RELAY NODE

(75) Inventors: Kyu Jin Park, Anyang-si (KR); Yeong Hyeon Kwon, Anyang-si (KR); Sung Ho Moon, Anyang-si (KR); Min Seok Noh, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 449 days.

(21) Appl. No.: 13/202,975

(22) PCT Filed: Feb. 24, 2010

(86) PCT No.: PCT/KR2010/001157
§ 371 (c)(1),
(2), (4) Date: Oct. 19, 2011

(87) PCT Pub. No.: WO2010/098584
PCT Pub. Date: Sep. 2, 2010

(65) Prior Publication Data
US 2012/0026934 A1  Feb. 2, 2012

Related U.S. Application Data

(60) Provisional application No. 61/154,769, filed on Feb. 24, 2009, provisional application No. 61/180,418, filed on May 21, 2009, provisional application No. 61/227,438, filed on Jul. 22, 2009, provisional application No. 61/246,974, filed on Sep. 29, 2009.

(30) Foreign Application Priority Data

Feb. 24, 2010 (KR) .................. 10-2010-0016718

(51) Int. Cl.
H04W 72/04 (2009.01)
(52) U.S. Cl.
USPC ........................................ 370/315
(58) Field of Classification Search
None
See application file for complete search history.

(56) References Cited

U.S. PATENT DOCUMENTS

2006/0046643 A1  3/2006  Izumikawa et al.
(Continued)

FOREIGN PATENT DOCUMENTS

CN  1964225  5/2007
CN  101232319  7/2008
(Continued)

OTHER PUBLICATIONS

Nortel Networks, "Control Channel and Data Channel Design for Relay Link in LTE-Advanced," R1-090153, TSG-RAN1 #55bis, Jan. 2009.
(Continued)

*Primary Examiner* — Sulaiman Nooristany
(74) *Attorney, Agent, or Firm* — Lee, Hong, Degerman, Kang & Waimey

(57) ABSTRACT

Disclosed is a method for enabling a relay node to transmit uplink control information. The relay node can receive resource allocation information and sequence information according to the transmission format of a physical uplink control channel set from a base station in advance. Additionally, the relay node can transmit the uplink control information, to which a sequence corresponding to the received sequence information is applied, in at least one slot of a resource area, which is indicated by the received resource allocation information, through a fixed number of symbols.

12 Claims, 54 Drawing Sheets

(56) References Cited

U.S. PATENT DOCUMENTS

| | | |
|---|---|---|
| 2008/0181167 A1 | 7/2008 | Sydir et al. |
| 2011/0136495 A1* | 6/2011 | Chen et al. .................... 455/450 |
| 2012/0026934 A1* | 2/2012 | Park et al. ..................... 370/315 |
| 2013/0100912 A1* | 4/2013 | Cai et al. ....................... 370/329 |

FOREIGN PATENT DOCUMENTS

| | | |
|---|---|---|
| CN | 101330306 | 12/2008 |
| WO | 2008/034349 | 3/2008 |

OTHER PUBLICATIONS

Nortel, "Control Channel and Data Channel Design for Relay Link in LTE-Advanced," R1-090753, 3GPP TSG-RAN Working Group 1 Meeting #56, Feb. 2009.

Nortel, "Control Channel and Data Channel Design for Relay Link in LTE-Advanced," 3GPP TSG-RAN Working Group 1 Meeting #56, R1-090753, Feb. 2009, 9 pages.

The State Intellectual Property Office of the People's Republic of China Application Serial No. 201080008890.0, Office Action dated Jul. 1, 2013, 9 pages.

* cited by examiner

Subframe-based PUCCH resource pairing in LTE
(a)

Slot-based R-PUCCH resource pairing
(b)

Reception viewpoint of eNode-B

Reception viewpoint of eNode-B

Transmission viewpoint of RN
(a)

Transmission viewpoint of RN
(b)

Reception viewpoint of eNode-B

Reception viewpoint of eNode-B

Transmission viewpoint of RN
(c)

Transmission viewpoint of RN
(d)

Reception viewpoint of eNode-B

☐ : DM RS
☐ : ACK/NACK feedback

Transmission viewpoint of RN
(e)

Reception viewpoint of eNode-B

Transmission viewpoint of RN (a)

⬚ : DM RS

⬚ : CQI information

Reception viewpoint of eNode-B

Transmission viewpoint of RN (b)

Reception viewpoint of eNode-B

Transmission viewpoint of RN (c)

Reception viewpoint of eNode-B

Reception viewpoint of eNode-B

Transmission viewpoint of RN

Transmission viewpoint of RN
(b)

Reception viewpoint of eNode-B

Transmission viewpoint of RN
(c)

▨ : DM RS

▦ : ACK/NACK feedback (a)

(b)

(c)

(d)

▨ : DM RS

☐ : ACK/NACK information (a)

(b)

(c)

(d)

▨ : DM RS

▦ : CQI information (a)

(b)

(c)

▨ : DM RS

▢ : CQI information (a)

(b)

☒ : DM RS

☐ : CQI information (a)

(b)

☒ : DM RS

☐ : CQI information (a)

▨ : Length-3 OC Sequence 1
▦ : Length-3 OC Sequence 2

(b)

▨ : Length-2 OC Sequence 1
▦ : Length-3 OC Sequence 2

(a)

(b)

(c)

(d)

◪ : DM RS

☐ : ACK/NACK information (a)

(b)

▨ : DM RS

☐ : CQI information (a)

(b)

(c)

▨ : DM RS

☐ : CQI information

☒ : DM RS

☐ : CQI information

Normal CP
(a)

Extended CP
(b)

☒ : DM RS

☐ : ACK/NACK information (a)

(b)

(c)

(d)

◩ : DM RS

☐ : ACK/NACK information (a)

(b)

▨ : DM RS

☐ : CQI information (a)

◸ : DM RS

⬚ : ACK/NACK information (b)

◸ : DM RS

⬚ : CQI information

Normal CP (a)

Extended CP (b)

▨ : Sequence 1

☐ : Sequence 2

(a)

■ : DM RS (a)

(b)

■ : DM RS (a)

(b)

■ : DM RS (a)

(b)

■ : DM RS

METHOD FOR ENABLING RELAY NODE TO TRANSMIT UPLINK CONTROL INFORMATION IN WIRELESS COMMUNICATION SYSTEM AND THE RELAY NODE

CROSS-REFERENCE TO RELATED APPLICATIONS

This application is a 371 U.S. national stage application of International Application No. PCT/KR2010/001157, filed on Feb. 24, 2010, which claims priority to Korean Application No. 10-2010-0016718, filed on Feb. 24, 2010, and U.S. Provisional Application Ser. Nos. 61/246,974, filed on Sep. 29, 2009, 61/227,438, filed on Jul. 22, 2009, 61/180,418, filed on May 21, 2009, and 61/154,769, filed on Feb. 24, 2009, the contents of which are incorporated by reference herein in their entirety.

FIELD OF THE INVENTION

The present invention relates to a wireless communication system, and more particularly to a method for enabling a relay node (RN) to transmit uplink control information.

BACKGROUND ART

If a channel condition between the eNode B and the UE is poor, a relay node (RN) is installed between the eNode-B and the UE such that it can provide an RF channel having superior channel conditions to the UE. In addition, a relay node (RN) is introduced to a cell edge region having a poor channel condition such that it can provide a higher-speed data channel and can extend a cell service region. As described above, the relay node (RN) has been widely used to solve the propagation shade region in a wireless communication system.

Compared to the conventional art that is restricted to functions of a repeater capable of amplifying/transmitting a signal, the latest technology is being developed to cover more intelligent techniques. Furthermore, the relay node (RN) technology can reduce costs associated with increasing the number of eNode-Bs and maintenance costs of a backhaul network in next generation mobile communication systems, and is requisite for extending the service coverage simultaneously while increasing the data processing rate. With the increasing development of relay node (RN) technology, the necessity for the relay node (RN) used in the conventional wireless communication system to be supported by the new wireless communication system is also increasing.

As the technology for forwarding a link connection between the BS and the UE is introduced to a relay node (RN) in a $3^{rd}$ Generation Partnership Project Long Term Evolution—Advanced (3GPP LTE-A) system, two links having different attributes are applied to an uplink (UL) carrier frequency band and a downlink (DL) carrier frequency band. The connection link between the BS and the RN is defined as a backhaul link. Transmission of data using downlink (DL) resources according to a Frequency Division Duplexing (FDD) or Time Division Duplexing (TDD) scheme is referred to as backhaul downlink. Transmission of data using uplink (UL) resources according to the FDD or TDD scheme is referred to as backhaul uplink.

In order to implement effective communication between the eNode-B and the RN, there is a need for the RN to transmit UL control information to the eNode-B. However, a method for allocating a transmission format of the eNode-B for the relay node (RN) in an LTE system, a method for signaling the above-mentioned allocation method, etc. so as to implement effective communication between the eNode-B and the RN have not been investigated yet.

DETAILED DESCRIPTION OF THE INVENTION

Technical Problem

An object of the present invention devised to solve the problem lies on a method for transmitting uplink control information of a relay node (RN).

Another object of the present invention devised to solve the problem lies on a relay node (RN) for transmitting uplink control information.

It is to be understood that technical objects to be achieved by the present invention are not limited to the aforementioned technical objects and other technical objects which are not mentioned will be apparent from the following description to the person with an ordinary skill in the art to which the present invention pertains.

Technical Solution

The object of the present invention can be achieved by providing a method for transmitting uplink control information by a relay node (RN) in a wireless communication system includes receiving resource allocation information and sequence information in accordance with a predetermined physical uplink control channel (PUCCH) transmission format from an eNode-B; and transmitting the uplink control information, to which a sequence corresponding to the received sequence information is applied, to the eNode-B through a predetermined number of symbols in at least one slot from among a resource region indicated by the received resource allocation information.

In another aspect of the present invention, a relay node (RN) for transmitting uplink control information in a wireless communication system includes a receiver for receiving resource allocation information and sequence information in accordance with a predetermined physical uplink control channel (PUCCH) transmission format from an eNode-B; and a transmitter for transmitting the uplink control information, to which a sequence corresponding to the received sequence information is applied, to the eNode-B through a predetermined number of symbols in at least one slot from among a resource region indicated by the received resource allocation information.

Effects of the Invention

As apparent from the above description, exemplary embodiments of the present invention have the following effects. A relay node (RN) can transmit uplink control information according to a newly defined transmission format. In addition, the RN can effectively transmit uplink control information in consideration of UL subframe timing and DL subframe timing.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a $3^{rd}$ Generation Partnership Project Long Term Evolution (3GPP LTE) mobile communication system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and denoted in the form of a block diagram on the basis of the important functions of the present invention. Wherever possible, the same reference numbers will be used throughout the drawings to refer to the same or like parts.

In the following description, "terminal" may refer to a mobile or fixed user equipment (UE), for example, a user equipment (UE), a mobile station (MS), an advanced mobile station (AMS) and the like. Also, "eNode-B" may refer to an arbitrary node of a network end which communicates with the above terminal, and may include a base station (BS), a Node B (Node-B), an eNode B (eNB), an access point (AP) and the like.

In a mobile communication system, the user equipment (UE) may receive information from the eNode-B via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
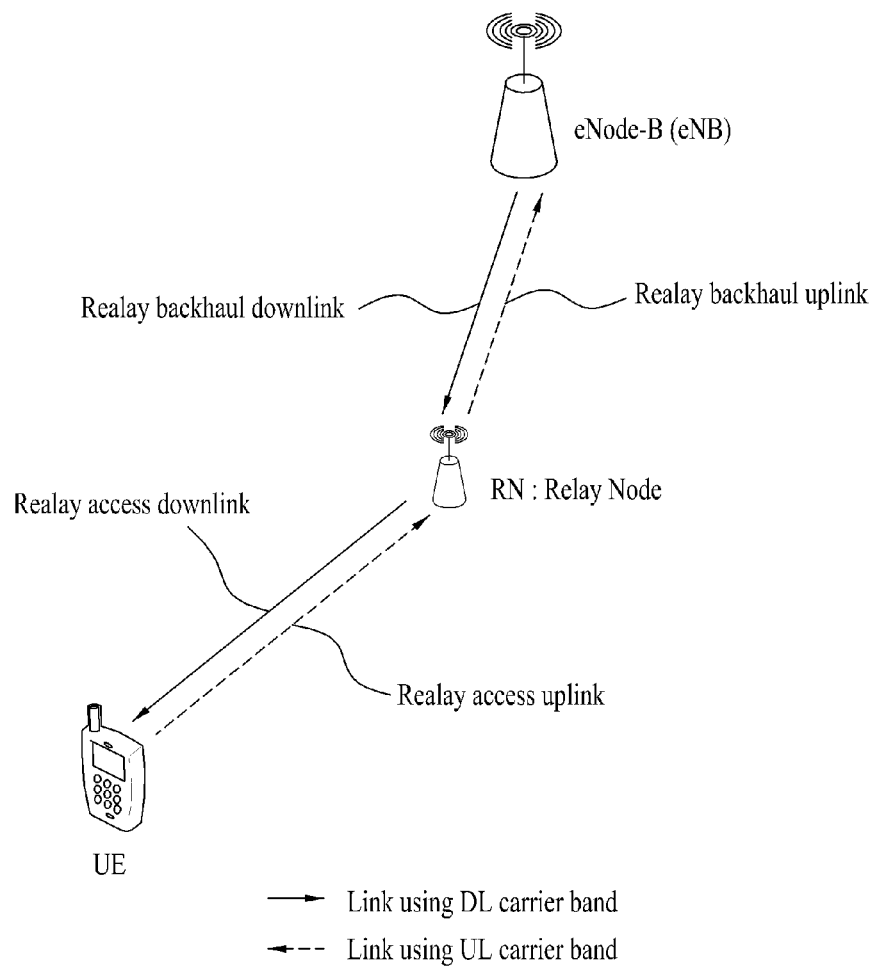
FIG. 1 is a conceptual diagram illustrating a relay backhaul link and a relay access link for use in a wireless communication system.

FIG. 1 is a conceptual diagram illustrating a relay backhaul link and a relay access link for use in a wireless communication system.

Referring to FIG. 1, an RN may receive information from the eNode-B from the RN through a relay backhaul downlink, and may transmit information to the eNode-B through a relay backhaul uplink. In addition, the RN may transmit information to the UE through a relay access downlink, or may receive information to the UE through a relay access uplink.

The RN may perform initial cell search such as synchronization with an eNode-B. For this operation, the RN may receive a synchronous (sync) channel from the eNode-B, such that it may establish synchronization with the eNode-B and may acquire information such as a cell ID. After that, the RN may receive a physical broadcast channel (PBCH) from the eNode-B so as to acquire broadcast information within a cell. Meanwhile, the RN receives a relay backhaul downlink reference signal at an initial cell search process, so that it can confirm a channel state of a relay backhaul downlink. The RN receives a physical downlink control channel (PDCCH), a relay-physical downlink control channel (R-PDCCH), and receives a relay-physical downlink control channel (R-PDCCH), a PDCCH-based physical downlink control channel (PDSCH), or a relay-physical downlink control channel (R-PDSCH), so that it can acquire mode detailed system information.

On the other hand, if the UE initially accesses the BS or if the UE does not have radio resources for signal transmission, it may perform a random access procedure to the BS. For the random access, the UE may transmit a predetermined sequence as a preamble to the eNode-B on a Physical Random Access CHannel (PRACH) and receive a response message for the random access on a relay-physical downlink control channel (R-PDCCH) and an R-PDSCH corresponding to the R-PDCCH. In the case of contention-based random access other than the handover case, the UE may perform a contention resolution procedure by transmitting an additional physical random access channel (PRACH) and receiving an R-PDCCH and an R-PDSCH.

After the foregoing procedure, the UE may transmit an R-PDCCH/R-PDSCH, an R-PUSCH/R-PUCCH, as a general downlink/uplink (DL/UL) signal transmission procedure. Here, uplink control information transmitted from the RN to the eNode-B or downlink control information transmitted from the eNode-B to the UE may include downlink (DL) or uplink (UL) ACKnowledgement/Negative ACKnowledgment (ACK/NACK) information, a Channel Quality Indicator (CQI), a Precoding Matrix Index (PMI) and/or a Rank Indicator (RI), etc. In case of the 3GPP LTE system, the RN may transmit control information such as CQI, PMI, RI, etc. through R-PUSCH/R-PUCCH.

Figure 2:
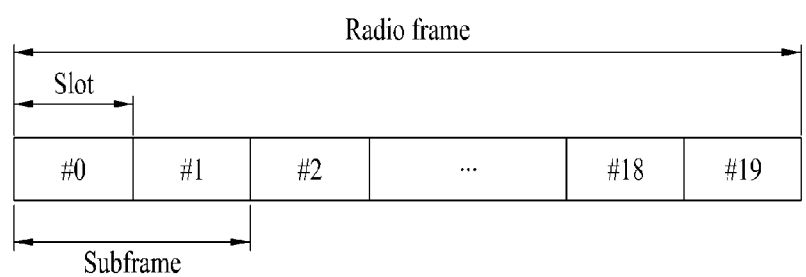
FIG. 2 is a conceptual diagram illustrating a frame structure of a 3$^{rd}$ Generation Partnership Project (3GPP) Long Term Evolution (LTE) system acting as an example of a mobile communication system.

FIG. 2 is a conceptual diagram illustrating a frame structure of the 3GPP LTE system acting as an example of a mobile communication system.

Referring to FIG. 2, one radio frame includes 10 subframes, and one subframe includes two slots in a time region. A time required for transmitting one subframe is defined as a Transmission Time Interval (TTI). For example, one subframe may have a length of 1 ms and one slot may have a length of 0.5 ms. One slot may include a plurality of orthogonal frequency division multiplexing (OFDM) symbols in a time region.

The 3GPP LTE system may use the OFDMA scheme in a downlink, and an OFDM symbol may represent one symbol period. The OFDM symbol may be considered to be one SC-FDMA symbol or one symbol period. A resource block (RB) may be used as a resource allocation unit, and may include a plurality of subcarriers neighboring with one slot. For example, one radio frame includes 10 subframes, and one subframe includes two slots, and one slot includes 7 OFDM symbols. However, the number of subframes, the number of slots, and the number of OFDM symbols may be changed in various ways. For convenience of description and better understanding of the present invention, it is assumed that 14 OFDM symbols are contained in one subframe.

As described above, it is necessary for the RN to implement two modules (i.e., a transmission (Rx) module and a reception (Rx) module) for each of the uplink and downlink. The implementation examples of the two modules are shown in Table 1.

TABLE 1

| Function | eNode-B | RN | UE |
|---|---|---|---|
| DL transmission | ○ | ○ | X |
| DL reception | X | ○ | ○ |
| UL transmission | X | ○ | ○ |
| UL reception | ○ | ○ | X |

Referring to Table 1, there is a need for the eNode-B to implement an Rx module in uplink and a Tx module in downlink, and there is a need for the UE to implement a Tx module in uplink and a Rx module in downlink. That is, the UE and the eNode-B need to implement one of a Tx module and an Rx module in UL or DL. However, the RN may relay signals or others received from the eNode-B to the UE. In response to the relaying such signals, the RN may relay signals received from the UE to the eNode-B, so that it is necessary to implement both the Tx module and the Rx module in each of uplink and downlink.

Figure 3:
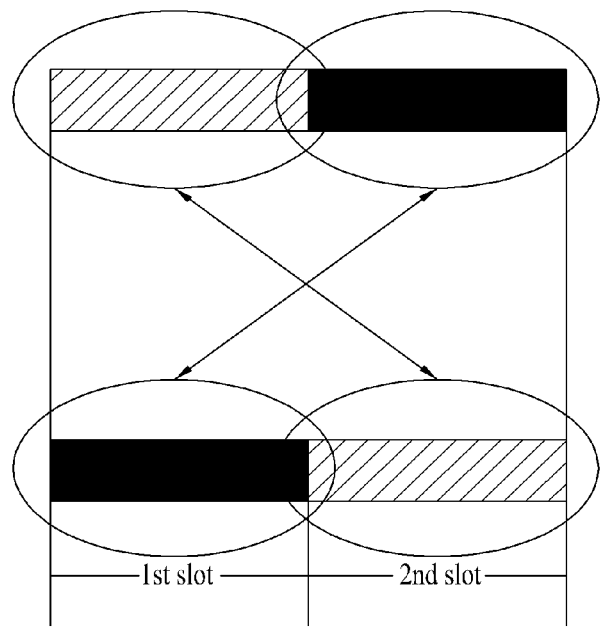
FIG. 3 is a conceptual diagram illustrating PUCCH or R-PUCCH resource pairing for use in an LTE system.
Figure 3:
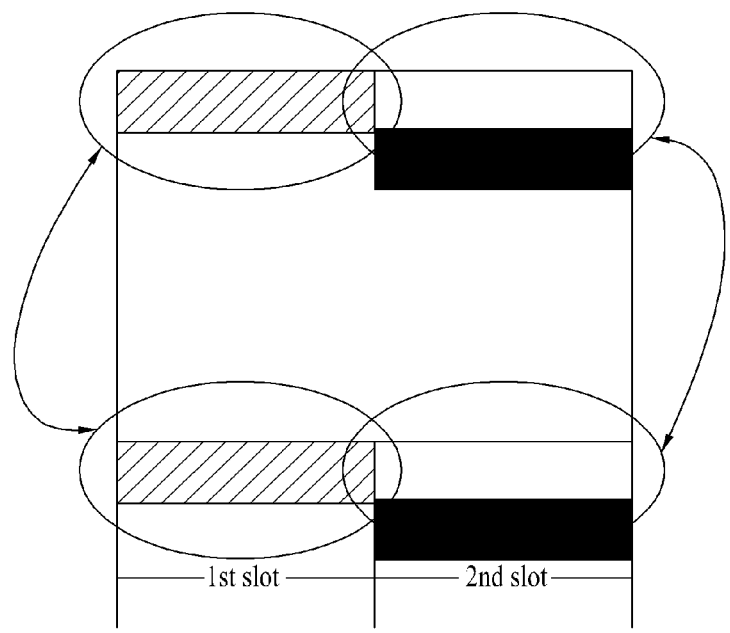

FIG. 3 is a conceptual diagram illustrating PUCCH or R-PUCCH resource pairing for use in an LTE system.

Referring to FIG. 3(a), PUCCH resource pairing may be configured on the basis of a subframe in the LTE system. The eNode-B may transmit a PDCCH to the UE through one pair of slots 310 and 320 using frequency hopping for frequency diversity.

A UL control channel (i.e., R-PUCCH) structure for a relay node (RN) may be configured in a different way from a PDCCH structure of the eNode-B shown in FIG. 3(a). As shown in the structure of FIG. 3(b), multiplexing between a UL backhaul and an uplink access may be achieved in slot units instead of slot units. That is, a relay node (RN) may transmit one R-PUCCH through (12 subcarriers×7 symbols) corresponding to one PRB size in one slot, or (12 subcarriers×7 symbols) corresponding to one PRB size in one slot makes one pair so that one R-PUCCH may be transmitted. When at least one RN transmits a demodulation reference signal (DM RS) within one PRB, each RN transmits the DM RS through different orthogonal codes, so that respective RNs may be distinguished from each other by such orthogonal codes.

Figure 4:
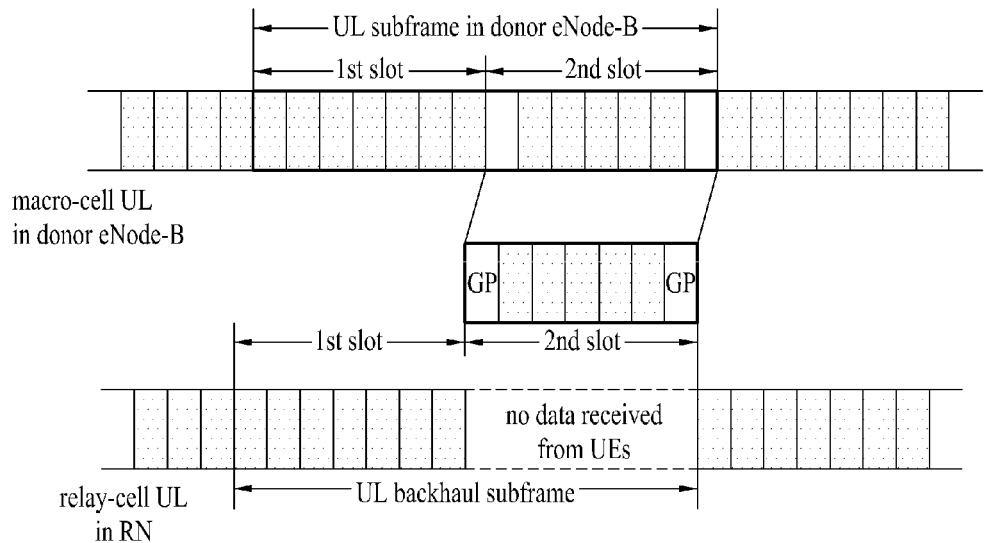
FIGS. 4 and 5 are diagrams illustrating a frame structure in which UL timing of a relay node (RN) and UL backhaul subframe reception timing of an eNode-B are aligned in a straight line.
Figure 5:
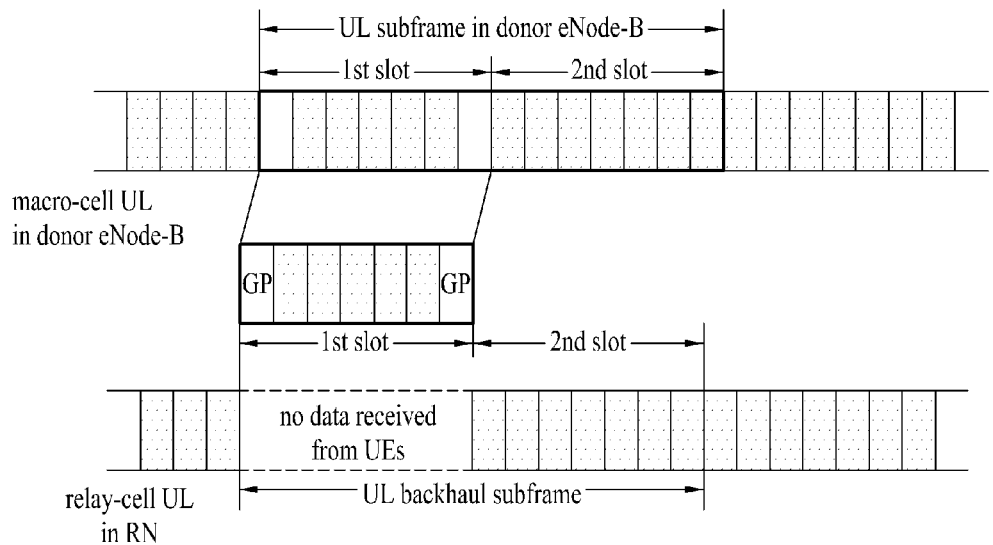

FIGS. 4 and 5 are diagrams illustrating a frame structure in which UL timing of a relay node (RN) and UL backhaul subframe reception timing of an eNode-B are aligned in a straight line.

In a UL backhaul subframe, one slot may be used as a backhaul. Referring to FIGS. 4 and 5, a donor eNode-B and a relay node (RN) may respectively perform backhaul transmission and backhaul reception using a second slot of one specific uplink backhaul subframe. From the reception viewpoint of the donor eNode-B (donor eNB), the first and last OFDM symbols of a slot used for a backhaul link in a UL backhaul subframe may be established as a guard period (GP) or a guard time (GT), and backhaul may be received through 5 symbols located after the GP or GT. On the contrary, from the transmission viewpoint of the RN, one front symbol and one rear symbol are established as a GP, and backhaul may be transmitted to the eNode-B through 5 symbols located between the front symbol and the rear symbol.

Referring to FIG. 5, the donor eNode-B and the RN may respectively perform backhaul transmission and backhaul reception using a first slot in one specific uplink backhaul subframe. From the reception viewpoint of the donor eNode-B, a first OFDM symbol and the last OFDM symbol of a slot used for a backhaul link in a UL backhaul subframe may be established as a GP or GT, and backhaul may be received through 5 symbols located after the GP or GT. On the contrary, from the transmission viewpoint of the RN, one front symbol and one rear symbol are established as a GP, and backhaul may be transmitted to the eNode-B through 5 symbols located between the front symbol and the rear symbol.

In the UL backhaul subframe structure shown in FIGS. 4 and 5, a method for enabling the RN to define R-PUCCH format for R-PUCCH transmission, and a method for allocating the defined R-PUCCH format will hereinafter be described in detail.

R-PUCCH format 1 may be used for ACK/NACK feedback, and may be classified into three formats (i.e., R-PUCCH format 1a, R-PUCCH format 1b, and R-PUCCH format 1c) according to the number of feedback bits. R-PUCCH format 1a may be used for 1-bit ACK/NACK feedback for one codeword, and may create a symbol through Binary Phase Shift Keying (BPSK) modulation. R-PUCCH format 1b may be used for 2-bit ACK/NACK feedback for 2 codewords, and may create a symbol through Quadrature Phase Shift Keying (QPSK) modulation. R-PUCCH format 1c may be used for 4-bit ACK/NACK feedback for 4 codewords, and may create a symbol through 16QAM (Quadrature Amplitude Modulation).

R-PUCCH format 1a to 1c may apply a Constant Amplitude Zero AutoCorrelation (CAZAC) sequence having the length of 12 to BPSK/QPSK/16QAM modulated symbols, so that the application result may be applied to each of 12 subcarriers of one symbol contained in one PRB. In this case, a cyclic shift of the sequence may be changed between a symbol and a slot. DM RSs transmitted from one or more RNs may be identified by different orthogonal codes.

In case of block wise spreading, a process for applying an orthogonal code in a time domain may be determined according to a DM RS allocation method and a cyclic prefix (CP) length.

Figure 6:
FIG. 6 is a diagram illustrating an example of a DM RS pattern based on an R-PUCCH format 1 for use in a UL backhaul subframe structure shown in FIGS. 4 and 5.
Figure 6:
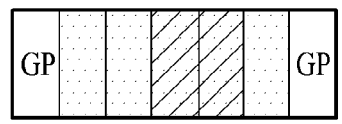
Figure 6:
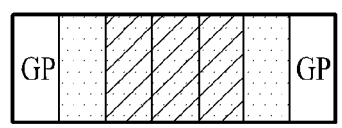
Figure 6:
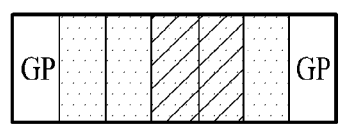
Figure 6:
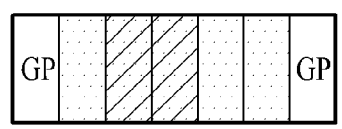
Figure 6:
Figure 6:
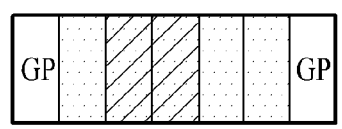
Figure 6:
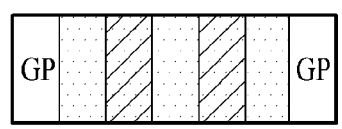
Figure 6:
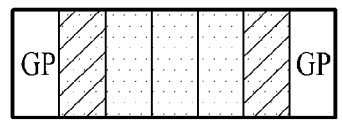
Figure 6:
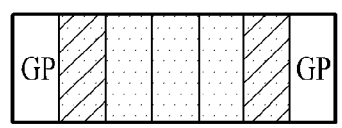

FIG. 6 is a diagram illustrating an example of a DM RS pattern based on an R-PUCCH format 1 for use in a UL backhaul subframe structure shown in FIGS. 4 and 5.

FIG. 6 shows a DM RS pattern not only from the reception viewpoint of the eNode-B but also from the transmission viewpoint of the RN. Referring to FIG. 6(a), a symbol for DM RS in one slot may be located at the center of the remaining 5 symbols other than the GP symbol located at both ends of the slot. A Discrete Fourier Transform (DFT) sequence having the length of 3 may be used as an orthogonal code sequence for DM RS of one slot. In addition, ACK/NACK feedback information may be located at the remaining 2 symbols other than a symbol in which a GP and a DM RS are located. A hadamard sequence having the length of 2 may be used as an orthogonal code sequence for ACK/NACK feedback information.

Referring to FIGS. 6(b) to 6(e), Hadamard sequence having the length of 2 may be used as an orthogonal code sequence for DM RS of one slot. In addition, a DFT sequence having the length of 2 may be used as an orthogonal code sequence for ACK/NACK feedback information.

R-PUCCH format 1 may be allocated by the eNode-B. The eNode-B may inform each RN of R-PUCCH resource allocation information and sequence information through higher layer signaling. Such resource allocation information may include information regarding resource block index, information regarding a slot hopping pattern, etc. The RN may transmit ACK/NACK feedback using the received sequence information.

Several R-PUCCH resources and sequences may be allocated to one RN in such a manner that the eNode-B can support a maximum number of codewords capable of being transmitted through a downlink R-PDSCH according to RN capacity (e.g., antenna configuration, etc.) and a quality of a link between the eNode-B and the RN. In addition, R-PUCCH format 1c may be selectively used by each RN according to a backhaul link quality. In this case, R-PUCCH resources and sequences allocated to one RN may be changed according to whether R-PUCCH format 1c is used or not. Additional PRB(s) may not be allocated for transmission of the R-PUCCH format 1, and LTE PUCCH multiplexing is performed in PRB(s) in which LTE PUCCH transmission is achieved, so that the RN may transmit ACK/NACK feedback.

R-PUCCH format 2 may be used for channel quality information (CQI) feedback transmission. For the modulation scheme, QPSK or 16QAM may be used. R-PUCCH format 2 may apply the CAZAC sequence having the length of 12 to a QPSK or 16QAM modulated symbol, so that the application result may be loaded on each of 12 subcarriers of one symbol in one PRB. In this case, a cyclic shift of the sequence may be changed between a symbol and a slot.

Figure 7:
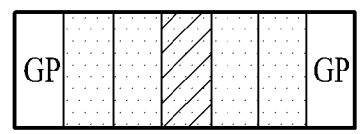
FIG. 7 is a diagram illustrating an example of a DM RS pattern based on an R-PUCCH format 2 for use in a UL backhaul subframe structure shown in FIGS. 4 and 5.
Figure 7:
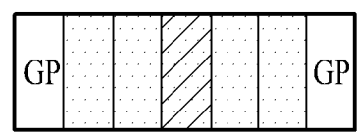
Figure 7:
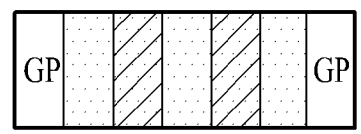
Figure 7:
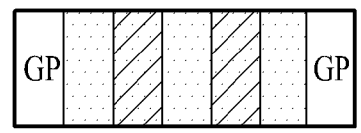
Figure 7:
Figure 7:

FIG. 7 is a diagram illustrating an example of a DM RS pattern based on an R-PUCCH format 2 for use in a UL backhaul subframe structure shown in FIGS. 4 and 5.

Referring to FIG. 7(a), a DM RS may be located at one arbitrary symbol within one slot of using a normal CP. Referring to FIGS. 7(a) to 7(c), DM RS may be located at two arbitrary symbols within one slot of using a normal CP.

R-PUCCH format 2 may be allocated by the eNode-B. The eNode-B may inform each RN of dedicated R-PUCCH resource allocation information and sequence information through higher layer signaling. The R-PUCCH format 2 modulation scheme may be established for each RN and then allocated.

Figure 8:
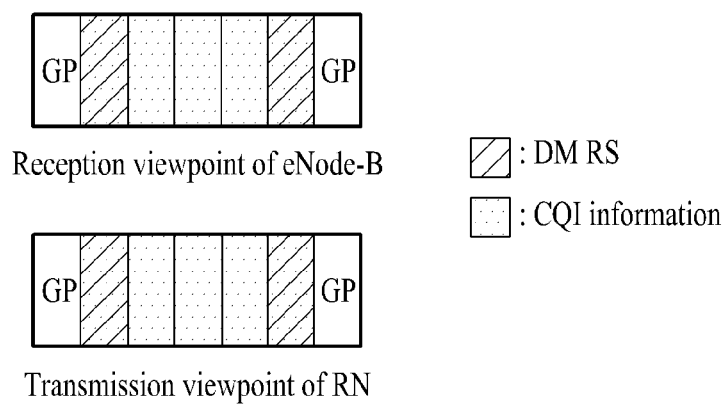
FIG. 8 is a diagram illustrating an example of a DM RS pattern based on an R-PUCCH format 2 for use in a UL backhaul subframe structure shown in FIGS. 4 and 5.

FIG. 8 is a diagram illustrating an example of a DM RS pattern based on an R-PUCCH format 2 for use in a UL backhaul subframe structure shown in FIGS. 4 and 5.

For R-PUCCH format 2 transmission, the RN may not allocate additional PRB(s), and LTE PUCCH multiplexing is performed in PRB(s) in which LTE PUCCH transmission is achieved, so that the RN may transmit ACK/NACK feedback. In this case, a DM RS pattern transmitted through a PUCCH by the RN is shown in FIG. 8.

The RN may reuse the ACK/NACK format so as to transmit a scheduling request (SR) channel. Based on the ACK/NACK channel, on-off keying scheme may be applied, and a sequence having the length of 5 (in case of using the extended CP, a sequence having the length of 4) without a reference signal may be divided into two orthogonal sequences and then applied.

Figure 9:
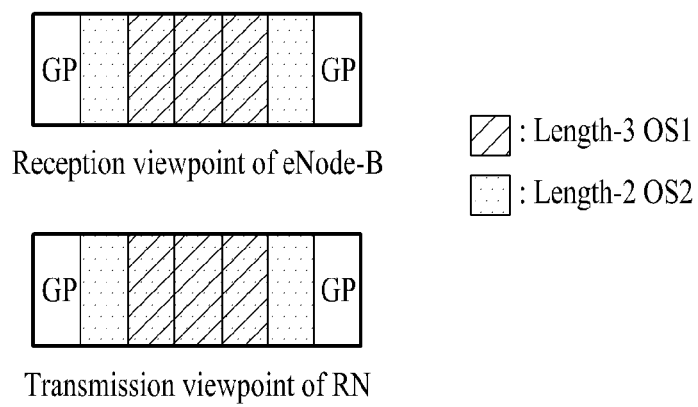
FIG. 9 is a diagram illustrating transmission of a scheduling request (SR) channel in a UL backhaul subframe structure shown in FIGS. 4 and 5.

FIG. 9 is a diagram illustrating transmission of a scheduling request (SR) channel in a UL backhaul subframe structure shown in FIGS. 4 and 5.

Referring to FIG. 9, the RN may apply a sequence having the length of 5 to the scheduling request (SR) channel on the basis of the ACK/NACK channel, and the application result may be transmitted to the eNode-B. In this case, the sequence having the length of 5 may be classified into two different orthogonal sequences, i.e., a first orthogonal sequence having the length of 3 and a second orthogonal sequence having the length of 2.

Figure 10:
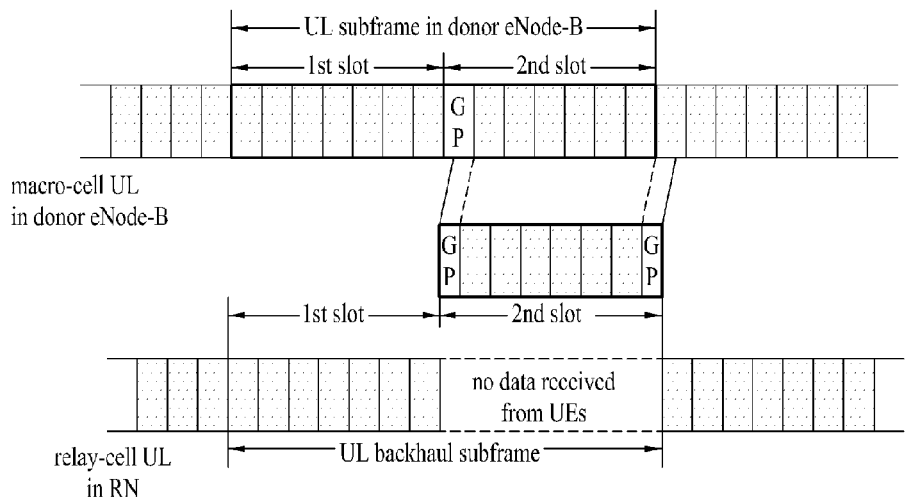
FIGS. 10 and 11 are diagrams illustrating a half-symbol (0.5 symbol) shifted frame structure as compared to UL timing of a relay node (RN) and UL backhaul subframe reception timing of an eNode-B.
Figure 11:
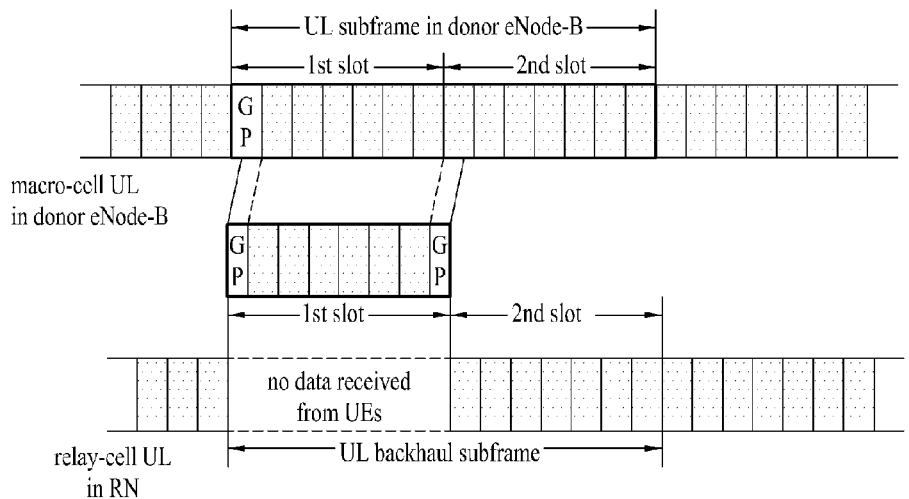

FIGS. 10 and 11 are diagrams illustrating a half-symbol (0.5 symbol) shifted frame structure as compared to UL timing of a relay node (RN) and UL backhaul subframe reception timing of an eNode-B.

In a UL backhaul subframe, one slot may be used as a backhaul. Referring to FIGS. 10 and 11, a donor eNode-B and a relay node (RN) may respectively perform backhaul transmission and backhaul reception using a first slot of one specific uplink backhaul subframe.

In the UL backhaul subframe structure shown in FIGS. 10 and 11, a method for enabling the RN to define R-PUCCH format for R-PUCCH transmission, and a method for allocating the defined R-PUCCH format will hereinafter be described in detail.

R-PUCCH format 1 may be used for ACK/NACK feedback, and may be classified into three formats (i.e., R-PUCCH format 1a, R-PUCCH format 1b, and R-PUCCH format 1c) according to the number of feedback bits. R-PUCCH format 1a may be used for 1-bit ACK/NACK feedback for one codeword, and may create a symbol through Binary Phase Shift Keying (BPSK) modulation. R-PUCCH format 1b may be used for 2-bit ACK/NACK feedback for 2 codewords, and may create a symbol through Quadrature Phase Shift Keying (QPSK) modulation. R-PUCCH format 1c may be used for 4-bit ACK/NACK feedback for 4 codewords, and may create a symbol through 16QAM (Quadrature Amplitude Modulation).

R-PUCCH format 1a to 1c may apply a CAZAC sequence having the length of 12 to BPSK/QPSK/16QAM modulated symbols, so that the application result may be loaded on each of 12 subcarriers of one symbol contained in one PRB. In this case, a cyclic shift of the sequence may be changed between a symbol and a slot.

In case of block wise spreading, a process for applying an orthogonal code in a time domain may be determined according to a DM RS allocation method and a cyclic prefix (CP) length.

Figure 12:
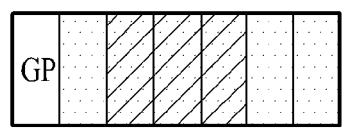
FIG. 12 is a conceptual diagram illustrating a DM RS pattern not only from the reception viewpoint at an eNode-B but also from the transmission viewpoint at a relay node (RN)
Figure 12:
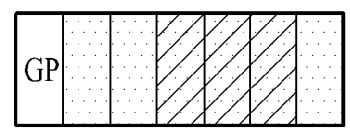
Figure 12:
Figure 12:
Figure 12:
Figure 12:

FIG. 12 is a conceptual diagram illustrating a DM RS pattern not only from the reception viewpoint at an eNode-B but also from the transmission viewpoint at a relay node (RN).

From the reception viewpoint of the donor eNode-B (donor eNB), the first OFDM symbol of a slot used for a backhaul link in a UL backhaul subframe may be established as a guard period (GP), and backhaul may be received through 6 symbols located after the GP. On the contrary, from the transmission viewpoint of the RN, a half front symbol (0.5 front symbol) and a half rear symbol (0.5 rear symbol) on the basis of the first slot are established as a GP, and backhaul may be transmitted to the eNode-B through 6 symbols located between the front symbol and the rear symbol.

In one slot, a symbol for DM RS may be located at three arbitrary symbols. FIGS. 12(a) and 12(b) exemplarily illustrate symbol positions for DM RS. A Discrete Fourier Transform (DFT) sequence having the length of 3 may be used as an orthogonal code sequence for DM RS of one slot and ACK/NACK feedback information. Referring to FIG. 12(c), Hadamard sequence having the length of 2 may be used as an orthogonal code sequence for DM RS of one slot. In addition, a DFT sequence having the length of 2 may be used as an orthogonal code sequence for ACK/NACK feedback information.

R-PUCCH format 1 may be allocated by the eNode-B. The eNode-B may inform each RN of R-PUCCH resource allocation information and sequence information through higher layer signaling. Several R-PUCCH resources and sequences may be allocated to one RN in such a manner that the eNode-B can support a maximum number of codewords capable of being transmitted through a downlink R-PDSCH according to RN capacity (e.g., antenna configuration, etc.) and a quality of a link between the eNode-B and the RN. In addition, R-PUCCH format 1c may be selectively used by each RN according to a backhaul link quality. In this case, R-PUCCH resources and sequences allocated to one RN may be changed according to whether R-PUCCH format 1c is used or not. Additional PRB(s) may not be allocated for transmission of the R-PUCCH format 1, and LTE PUCCH multiplexing is performed in PRB(s) in which LTE PUCCH transmission is achieved, so that the RN may transmit ACK/NACK feedback.

R-PUCCH format 2 may be used for channel quality information (CQI) feedback transmission. For the modulation scheme, QPSK or 16QAM may be used. R-PUCCH format 2 may apply the CAZAC sequence having the length of 12 to a QPSK or 16QAM modulated symbol, so that the application result may be loaded on each of 12 subcarriers of one symbol in one PRB. In this case, a cyclic shift of the sequence may be changed between a symbol and a slot.

Figure 13:
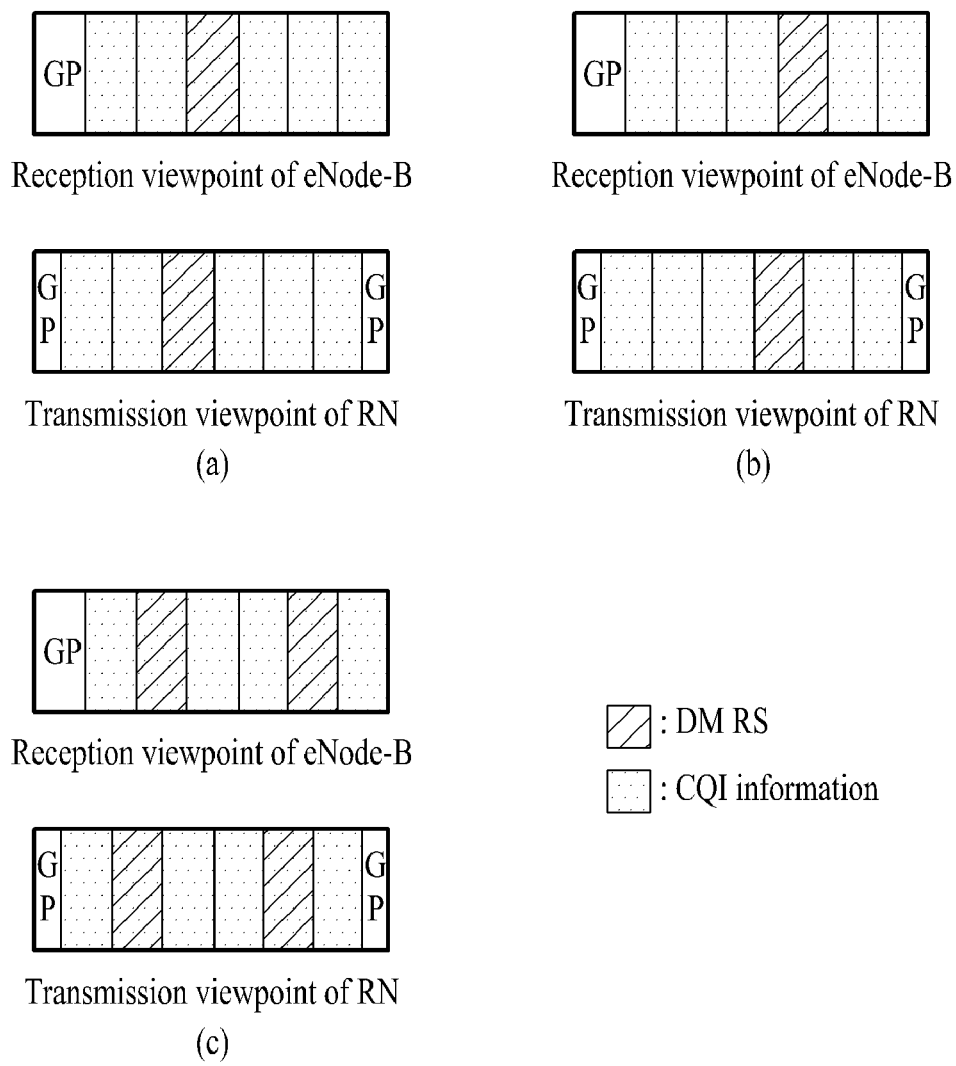
FIG. 13 is a diagram illustrating an example of a DM RS pattern based on an R-PUCCH format 2 for use in a UL backhaul subframe structure shown in FIGS. 10 and 11.

FIG. 13 is a diagram illustrating an example of a DM RS pattern based on an R-PUCCH format 2 for use in a UL backhaul subframe structure shown in FIGS. 10 and 11.

Referring to FIGS. 13(a) and 13(b), a DM RS may be located at one arbitrary symbol within one slot of using a normal CP. Referring to FIG. 13(c), DM RS may be located at two arbitrary symbols within one slot of using a normal CP.

R-PUCCH format 2 may be allocated by the eNode-B. The eNode-B may inform each RN of dedicated R-PUCCH resource and sequence through higher layer signaling. The R-PUCCH format 2 modulation scheme may be established for each RN and then allocated.

Figure 14:
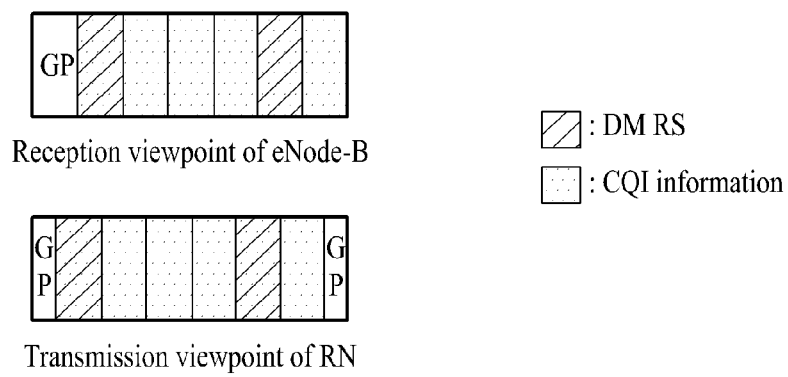
FIG. 14 is a diagram illustrating an example of a DM RS pattern based on an R-PUCCH format 2 for use in a UL backhaul subframe structure shown in FIGS. 10 and 11.

FIG. 14 is a diagram illustrating an example of a DM RS pattern based on an R-PUCCH format 2 for use in a UL backhaul subframe structure shown in FIGS. 10 and 11.

For R-PUCCH format 2 transmission, the RN may not allocate additional PRB(s), and LTE PUCCH multiplexing is performed in PRB(s) in which LTE PUCCH transmission is achieved, so that the RN may transmit ACK/NACK feedback. In this case, a DM RS pattern transmitted through a PUCCH by the RN is shown in FIG. 14. One RN may transmit the DM RS pattern through one RN as necessary.

The RN may reuse the ACK/NACK format so as to transmit a scheduling request (SR) channel. Based on the ACK/NACK channel, on-off keying scheme may be applied, and a sequence having the length of 5 (in case of using the extended CP, a sequence having the length of 4) without a reference signal may be divided into two orthogonal sequences and then applied.

Figure 15:
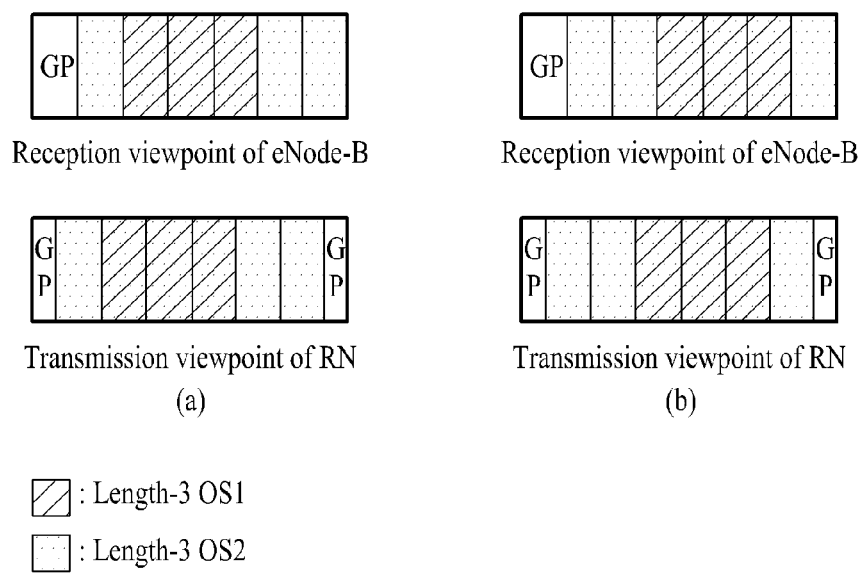
FIG. 15 is a diagram illustrating transmission of a scheduling request (SR) channel in a UL backhaul subframe structure shown in FIGS. 10 and 11.

FIG. 15 is a diagram illustrating transmission of a scheduling request (SR) channel in a UL backhaul subframe structure shown in FIGS. 10 and 11.

Referring to FIG. 15, the RN may apply a sequence having the length of 5 to the scheduling request (SR) channel on the basis of the ACK/NACK channel, and the application result may be transmitted to the eNode-B. In this case, the sequence having the length of 5 may be classified into two different orthogonal sequences, i.e., a first orthogonal sequence having the length of 3 and a second orthogonal sequence having the length of 2. In order to enable the RN to transmit the scheduling request (SR) signal, additional PRB(s) may not be allocated, and PUCCH resources for LTE PUCCH format 1 may be reused. In this case, the RN may transmit the SR signal only through a symbol corresponding to a first orthogonal sequence (in case of using the extended CP, a first orthogonal sequence having the length of 2) having the length of 3 shown in FIGS. 15(a) and 15(b). In other words, the RN may not transmit any signal through a symbol to which the second orthogonal sequence is applied.

However, the ACK/NACK format is reused, and is divided into a DM RS and an information symbol. The ACK/NACK format may include all the cases of the above-mentioned R-PUCCH format 1. The modulation scheme may be QPSK or 16QAM (or 64QAM). The information symbol may include information regarding a quantized buffer state (for example, if the modulation scheme is a QPSK, 2 bits may display quantized buffer state information having four levels) according to a modulation scheme. Therefore, a donor eNode-B may determine the amount of uplink resources that are allocated to the RN by the donor eNode-B.

In contrast, the RN may reuse R-PUCCH format 2 to transmit a scheduling request (SR) channel. The RN may use the R-PUCCH format 2 structure for CQI feedback, and may feed back the quantized buffer state information instead of the CQI through the information symbol.

However, the RN may allocate the SR channel to each RN. In this case, the RN may transmit at least one of SR channel resources, resource index, and modulation scheme to each RN through higher layer signaling.

The foregoing description has explained that DM RS and the like are transmitted and received using one slot within one specific UL backhaul subframe. The following description will disclose that DM RS and the like are transmitted and received using two slots in the entirety of one specific UL backhaul subframe.

During UL backhaul transmission from the RN to the eNode-B through a specific UL backhaul subframe, the number of OFDM symbols capable of being transmitted from the RN may be changed according to a method for establishing UL subframe timing by the RN in consideration of a guard period (GP) or guard time (GT) for reception/transmission transition of an RF chain for use in the RN.

Figure 16:
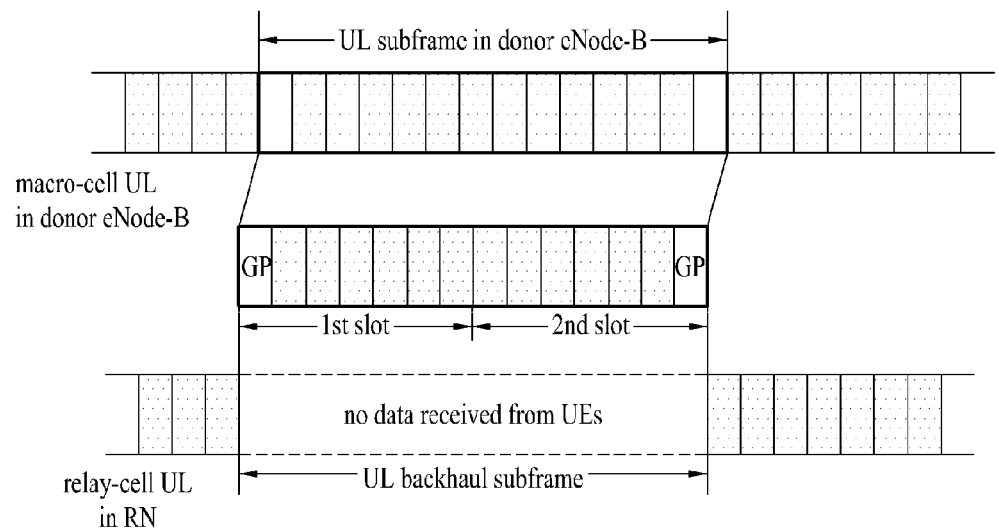
FIGS. 16 to 18 are diagrams illustrating a frame structure in which UL timing of a relay node (RN) and UL backhaul subframe reception timing of an eNode-B are aligned in a straight line.
Figure 17:
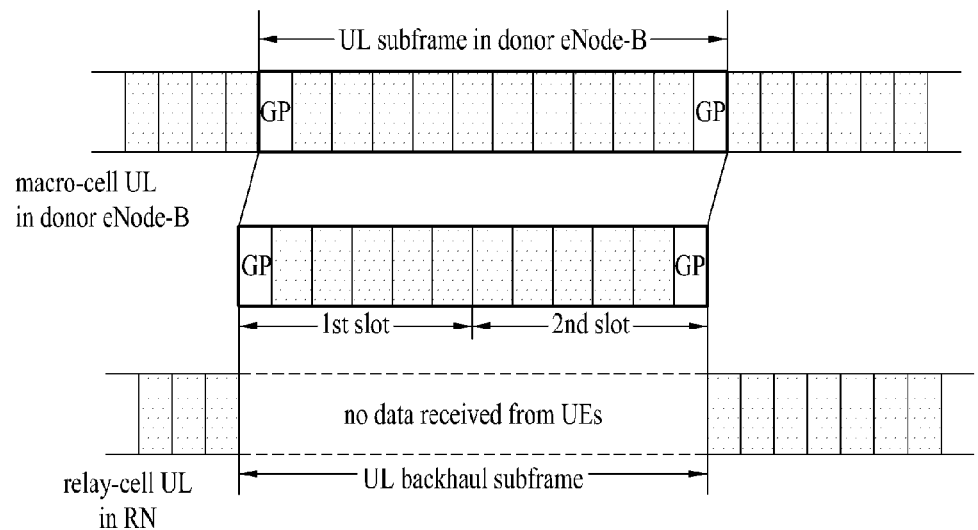
Figure 18:
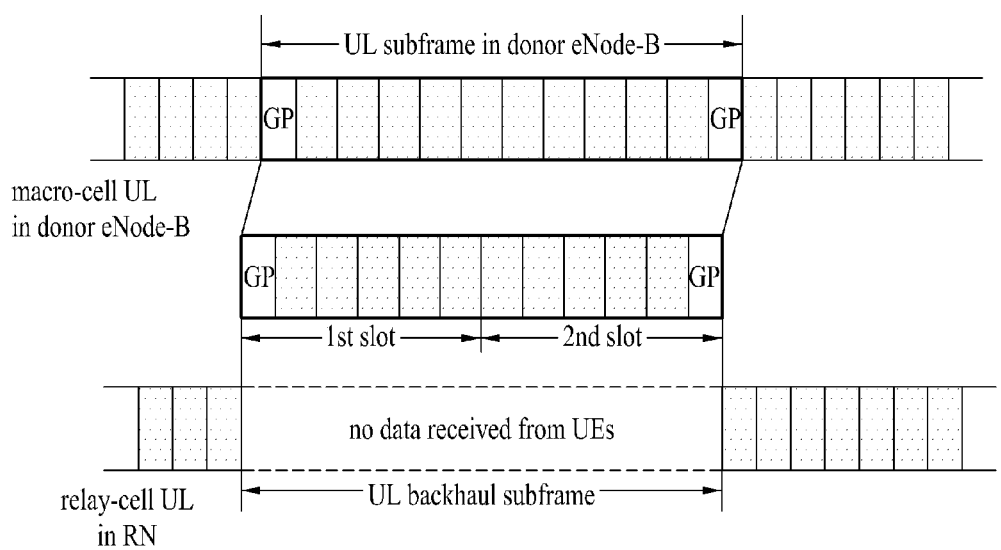

FIGS. 16 to 18 are diagrams illustrating a frame structure in which UL timing of a relay node (RN) and UL backhaul subframe reception timing of an eNode-B are aligned in a straight line.

Referring to FIGS. 16 to 18, UL subframe timing of the RN is synchronized according to a UL timing advance value that is adjusted through a Random Access Channel (RACH) procedure related to the donor eNode-B during the initial entry procedure of the RN, one front symbol and one rear symbol on the basis of a specific backhaul subframe may be established as a GP.

When both a backhaul link and an access link use a normal CP as shown in FIG. 16, 12 symbols from among a total of 14 symbols are available for UL backhaul transmission. However, when using the extended CP is used for either UL backhaul or an access link and UL backhaul as shown in FIGS. 17 and 18, 10 symbols from among a total of 12 symbols may be available for UL backhaul transmission.

The donor eNode-B may semi-statically allocate one or more PRBs for R-PUCCH transmission, and the allocated PRB(s) may be transmitted to the RN through higher layer signaling. For example, the corresponding higher layer signaling may be cell-specific signaling, and may be broadcast to all RNs contained in a cell. In another example, the higher layer signaling may be RN-specific signaling, and may be unicast to each RN. In order to acquire diversity gain during R-PUCCH transmission, slot hopping may be applied in PRB(s) reserved for R-PUCCH transmission in the same manner as in PUCCH transmission.

In the UL backhaul subframe structure shown in FIGS. 16 to 18, a method for enabling the RN to define R-PUCCH format for R-PUCCH transmission, and a method for allocating the defined R-PUCCH format will hereinafter be described in detail.

R-PUCCH format 1 may be used for ACK/NACK feedback, and may be classified into three formats (i.e., R-PUCCH format 1a, R-PUCCH format 1b, and R-PUCCH format 1c) according to the number of feedback bits. R-PUCCH format 1a may be used for 1-bit ACK/NACK feedback for one codeword, and may create a symbol through Binary Phase Shift Keying (BPSK) modulation. R-PUCCH format 1b may be used for 2-bit ACK/NACK feedback for 2 codewords, and may create a symbol through Quadrature Phase Shift Keying (QPSK) modulation. R-PUCCH format 1c may be used for 4-bit ACK/NACK feedback for 4 codewords, and may create a symbol through 16QAM (Quadrature Amplitude Modulation).

R-PUCCH format 1a to 1c may apply a CAZAC sequence having the length of 12 to BPSK/QPSK/16QAM modulated symbols, so that the application result may be applied to each of 12 subcarriers of one symbol contained in one PRB. In this case, a cyclic shift of the sequence may be changed between a symbol and a slot.

In case of block wise spreading, a process for applying an orthogonal code in a time domain may be determined according to a DM RS allocation method and a cyclic prefix (CP) length.

Figure 19:
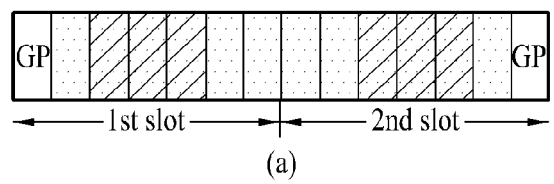
FIG. 19 is a diagram illustrating an example of a DM RS pattern based on an R-PUCCH format 1 for use in a UL backhaul subframe structure shown in FIGS. 16 to 18.
Figure 19:
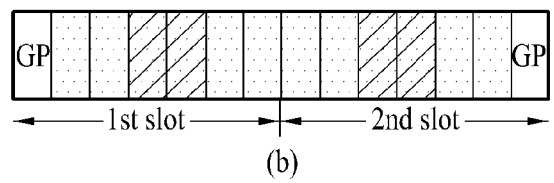
Figure 19:
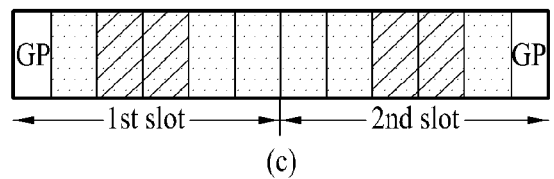
Figure 19:
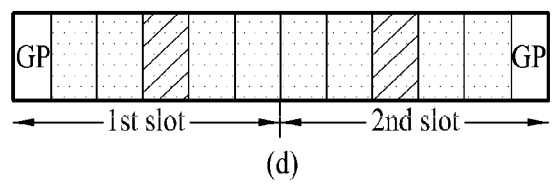

FIG. 19 is a diagram illustrating an example of a DM RS pattern based on an R-PUCCH format 1 for use in a UL backhaul subframe structure shown in FIGS. 16 to 18.

Referring to FIG. 19(a), in case of using a normal CP, each of an orthogonal sequence for DM RS and another orthogonal for ACK/NACK information in each of the first and second slots may be a DFT sequence having the length of 3. Referring to FIG. 19(b), in case of using a normal CP, each of an orthogonal sequence for DM RS and another orthogonal for ACK/NACK information in each of the first and second slots may be a DFT sequence having the length of 2. In this case, a hadamard sequence having the length of 2 may be used as an orthogonal code sequence for DM RS in each of the first and second slots. In addition, a DFT sequence having the length of 4 may be used as an orthogonal code sequence for ACK/NACK feedback information.

Referring to FIG. 19(c), in case of using the extended CP, each of an orthogonal sequence for DM RS and another orthogonal for ACK/NACK information in each of the first and second slots may be a DFT sequence having the length of 2. In this case, a hadamard sequence having the length of 2 may be used as an orthogonal code sequence for DM RS in each of the first and second slots. In addition, a DFT sequence having the length of 3 may be used as an orthogonal code sequence for ACK/NACK feedback information.

Referring to FIG. 19(d), in case of using the extended CP, orthogonal covering is not loaded on a time domain, and a hadamard sequence having the length of 4 may be used as an orthogonal sequence for ACK/NACK information.

R-PUCCH format 1 may be allocated by the eNode-B. The eNode-B may inform each RN of R-PUCCH resource allocation information and sequence information through higher layer signaling. Several R-PUCCH resources and sequences may be allocated to one RN in such a manner that the eNode-B can support a maximum number of codewords capable of being transmitted through a downlink R-PDSCH according to RN capacity (e.g., antenna configuration, etc.) and a quality of a link between the eNode-B and the RN. In addition, R-PUCCH format 1c may be selectively used by each RN according to a backhaul link quality. In this case, R-PUCCH resources and sequences allocated to one RN may be changed according to whether R-PUCCH format 1c is used or not.

Additional PRB(s) may not be allocated for transmission of the R-PUCCH format 1, and LTE PUCCH multiplexing is performed in PRB(s) in which LTE PUCCH transmission is achieved, so that the RN may transmit ACK/NACK feedback. However, in this case, R-PUCCH transmission of the RN is achieved only through a second slot. In this case, the DM RS may be transmitted as a pattern corresponding to the second slot shown in FIG. 19(a). However, in case of using the extended CP, DM RS may be transmitted as a pattern corresponding to the second slot shown in FIG. 19(c).

In case of using a macro cell UE, the above-mentioned description is made available only when data transmission is achieved using ACK/NACK format shortened through the second slot. In order to allow one RN to further guarantee a QoS for ACK/NACK transmission, one ACK/NACK feedback signaling may be transmitted through several PRBs of the second slot.

R-PUCCH format 2 may be used for channel quality information (CQI) feedback transmission. For the modulation scheme, QPSK or 16QAM may be used. R-PUCCH format 2 may apply the CAZAC sequence having the length of 12 to a QPSK or 16QAM modulated symbol, so that the application result may be loaded on each of 12 subcarriers of one symbol in one PRB. In this case, a cyclic shift of the sequence may be changed between a symbol and a slot.

Figure 20:
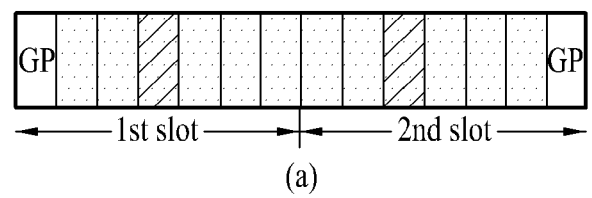
FIGS. 20 and 21 are diagrams illustrating an example of a DM RS pattern based on an R-PUCCH format 2 for use in a UL backhaul subframe structure in case of using a normal CP.
Figure 20:
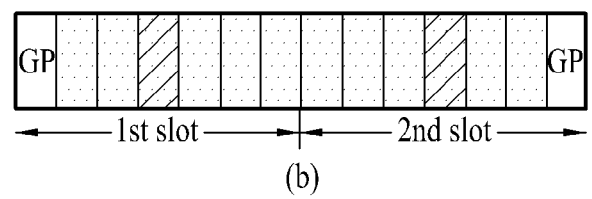
Figure 20:
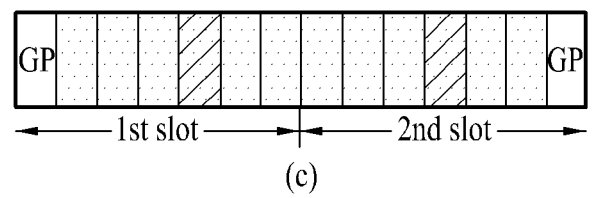
Figure 20:
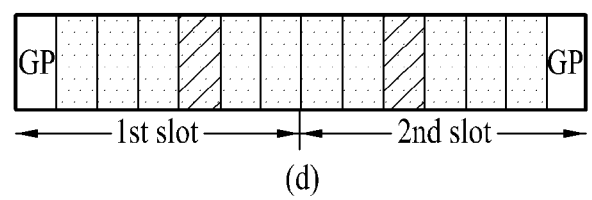
Figure 21:
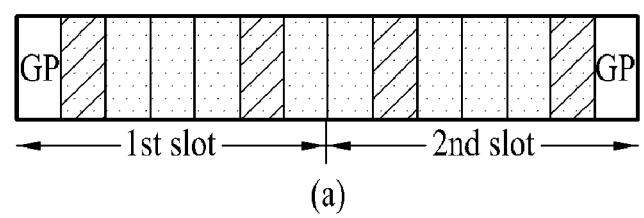
Figure 21:
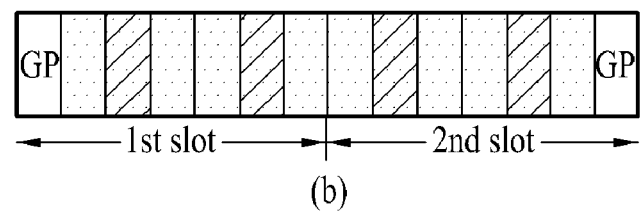
Figure 21:
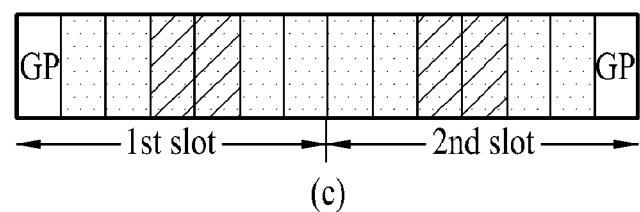

FIGS. 20 and 21 are diagrams illustrating an example of a DM RS pattern based on an R-PUCCH format 2 for use in a UL backhaul subframe structure in case of using a normal CP.

In FIG. 20, a DM RS may be located at one arbitrary symbol in each of the first and second slots. The position of the DM RS shown in FIG. 20 is disclosed only for illustrative purposes. The RN encodes the modulation scheme using the (20,A) simplex code (QPSK) or the (40,A) simplex code (16QAM), and transmits the encoded result.

In FIG. 21, a DM RS may be located at two arbitrary symbols in each of the first and second slots. The position of the DM RS shown in FIG. 21 is disclosed only for illustrative purposes. The RN encodes the modulation scheme using the (16,A) simplex code (QPSK) or the (32,A) simplex code (16QAM), and transmits the encoded result.

Figure 22:
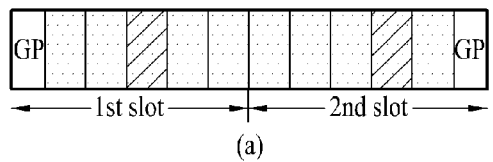
FIG. 22 is a diagram illustrating an example of a DM RS pattern based on an R-PUCCH format 2 for use in a UL backhaul subframe structure in case of using an extended CP.
Figure 22:
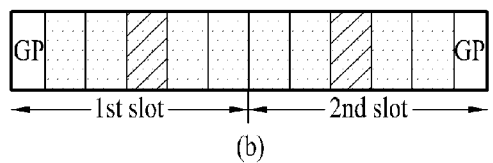

FIG. 22 is a diagram illustrating an example of a DM RS pattern based on an R-PUCCH format 2 for use in a UL backhaul subframe structure in case of using an extended CP.

In FIG. 22, a DM RS may be located at a predetermined specific symbol in each of the first and second slots. The position of the DM RS shown in FIG. 22 is disclosed only for illustrative purposes. The RN encodes the modulation scheme using the (16,A) simplex code (QPSK) or the (32,A) simplex code (16QAM), and transmits the encoded result.

R-PUCCH format 2 may be allocated by the eNode-B. The eNode-B may inform each RN of dedicated R-PUCCH resource allocation information and sequence information through higher layer signaling. The R-PUCCH format 2 modulation scheme may be established for each RN and then allocated.

Figure 23:
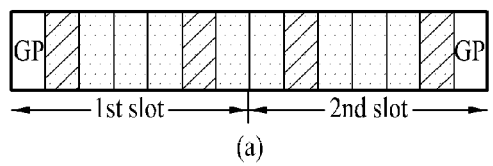
FIG. 23(a) is a diagram illustrating an example of a DM RS pattern based on an R-PUCCH format 2 for use in a UL backhaul subframe structure in case of using a normal CP.
FIG. 23(b) is a diagram illustrating an example of a DM RS pattern based on an R-PUCCH format 2 for use in a UL backhaul subframe structure in case of using an extended CP.
Figure 23:
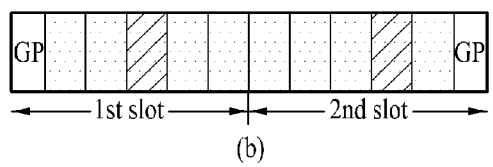

For R-PUCCH format 2 transmission, the RN may not allocate additional PRB(s), and LTE PUCCH multiplexing is performed in PRB(s) in which LTE PUCCH transmission is achieved, so that the RN may transmit ACK/NACK feedback. In this case, a DM RS pattern transmitted through a PUCCH by the RN is shown in FIG. 23.

FIG. 23(a) is a diagram illustrating an example of a DM RS pattern based on an R-PUCCH format 2 for use in a UL backhaul subframe structure in case of using a normal CP, and FIG. 23(b) is a diagram illustrating an example of a DM RS pattern based on an R-PUCCH format 2 for use in a UL backhaul subframe structure in case of using an extended CP.

Referring to FIG. 23(a), in case of using the normal CP, a DM RS may be located at two arbitrary symbols in each of the first and second slots. The position of the DM RS shown in FIG. 23(a) is disclosed only for illustrative purposes. Referring to FIG. 23(b), in case of using the extended CP, a DM RS may be located at one symbol in each of the first and second slots, and the structure shown in FIG. 23(b) may be disclosed only for illustrative purposes. In this case, when the RN transmits a CQI feedback, the modulation scheme may be encoded into the (16,A) simplex code or the (32,A) simplex code, and then transmitted. In addition, one RN may be transmitted through several PRBs.

The RN may reuse the ACK/NACK format so as to transmit a scheduling request (SR) channel. Based on the ACK/NACK channel, on-off keying scheme may be applied, and a sequence having the length of 6 (in case of using the extended CP, a sequence having the length of 5) without a reference signal may be divided into two orthogonal sequences and then applied.

Figure 24:
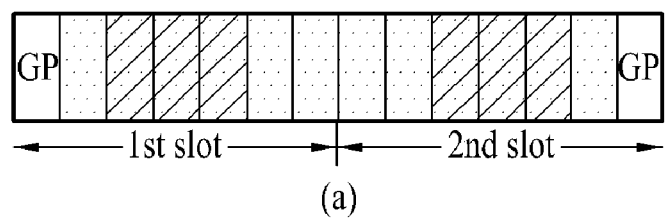
FIG. 24 is a diagram illustrating transmission of a scheduling request (SR) channel for use in a UL backhaul subframe structure shown in FIGS. 16 to 18.
Figure 24:
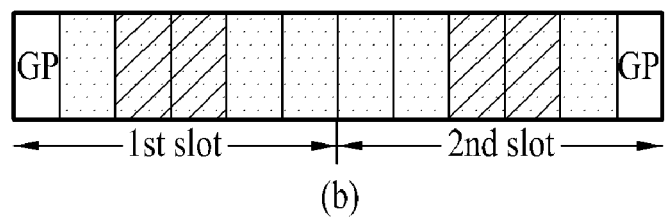

FIG. 24 is a diagram illustrating transmission of a scheduling request (SR) channel for use in a UL backhaul subframe structure shown in FIGS. 16 to 18.

Referring to FIG. 24, in order to enable the RN to transmit the scheduling request (SR) signal, additional PRB(s) may not be allocated, and PUCCH resources for LTE PUCCH format 1 may be reused. In this case, the RN may transmit the SR signal only through a first orthogonal sequence having the length of 3 shown in FIG. 24(a) or a second orthogonal sequence having the length of 2 shown in FIG. 24(b). In other words, the RN may not transmit any signal through a symbol to which the second orthogonal sequence is applied.

However, the ACK/NACK format is reused, and is divided into a DM RS and an information symbol. The ACK/NACK format may include all the cases of the above-mentioned R-PUCCH format 1. The modulation scheme may be QPSK or 16QAM (or 64QAM). The information symbol may include information regarding a quantized buffer state (for example, if the modulation scheme is a QPSK, 2 bits may display quantized buffer state information having 4 levels) according to a modulation scheme. Therefore, a donor eNode-B may determine the amount of uplink resources that are allocated to the RN by the donor eNode-B.

In contrast, the RN may reuse R-PUCCH format 2 to transmit a scheduling request (SR) channel. The RN may use the R-PUCCH format 2 structure for CQI feedback, and may feed back the quantized buffer state information instead of the CQI through the information symbol.

However, the RN may allocate the SR channel to each RN. In this case, the RN may transmit at least one of SR channel resources, resource index, and modulation scheme to each RN through higher layer signaling.

Figure 25:
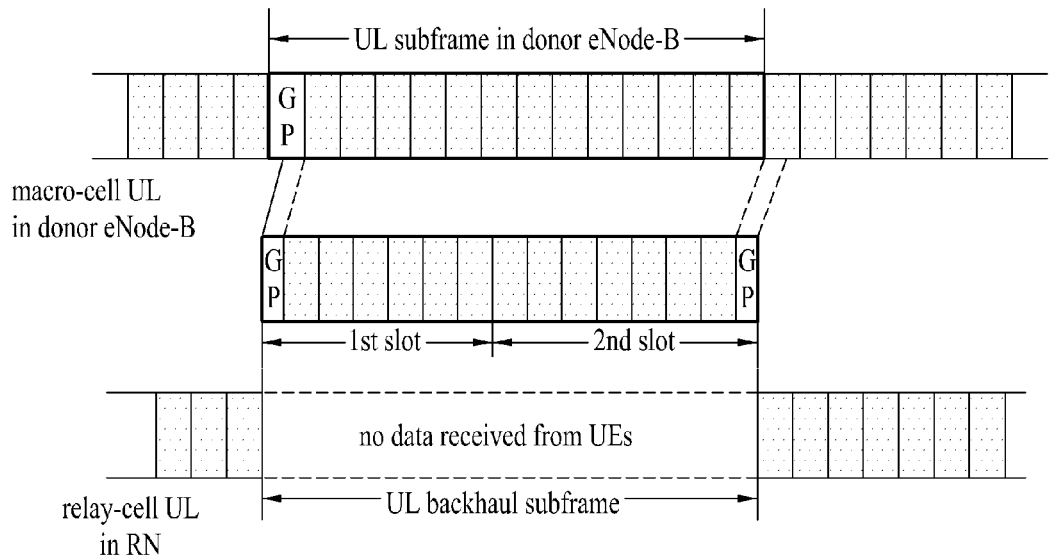
FIGS. 25 to 27 are diagrams illustrating a frame structure in which UL timing of a relay node (RN) is shifted by a half symbol (0.5 symbol) as compared to UL backhaul subframe reception timing of an eNode-B.
Figure 26:
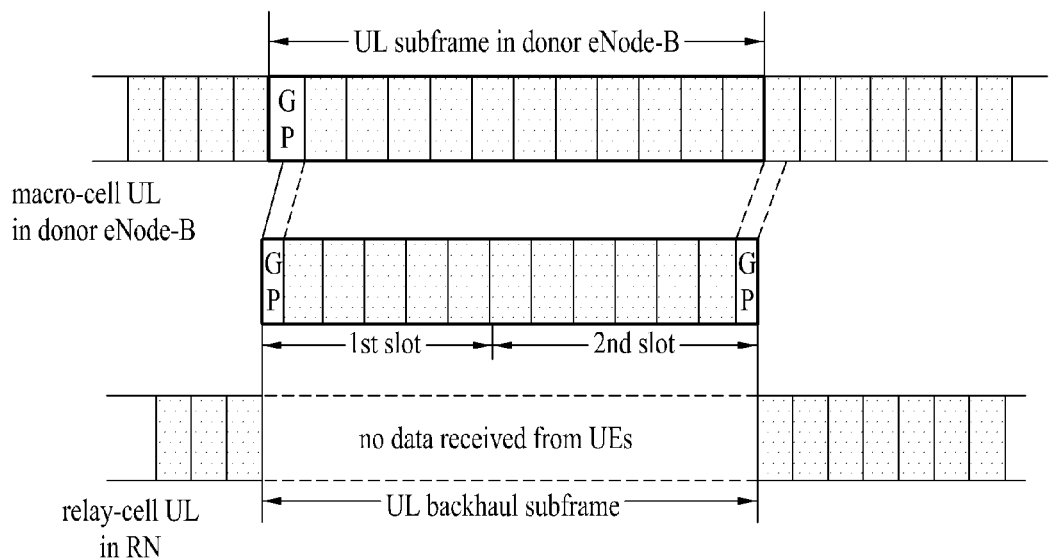
Figure 27:
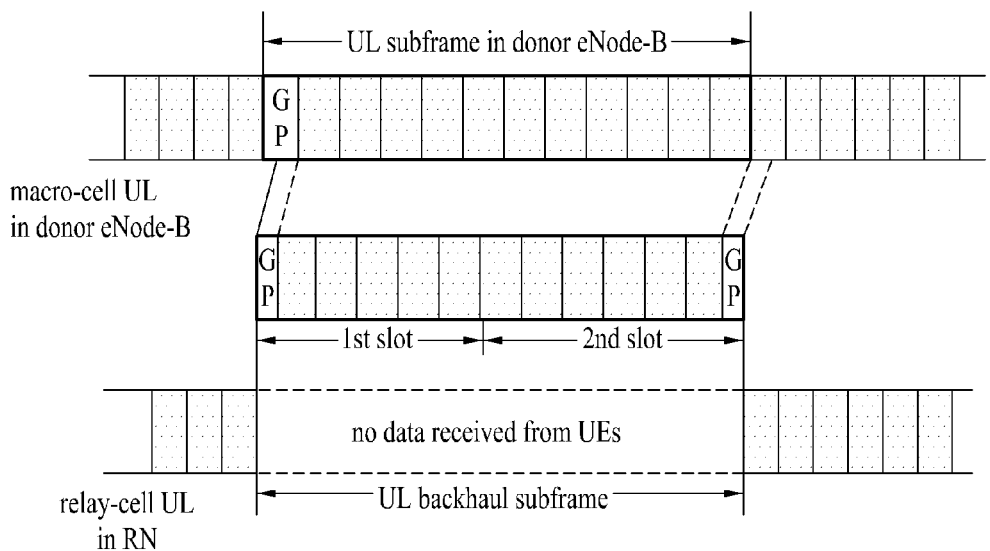

FIGS. 25 to 27 are diagrams illustrating a frame structure in which UL timing of a relay node (RN) is shifted by a half symbol (0.5 symbol) as compared to UL backhaul subframe reception timing of an eNode-B.

As can be seen from FIGS. 25 to 27, UL subframe timing of the RN is synchronized in response to a specific value acquired when a ½ symbol length is added to a UL timing advance value adjusted through a random access procedure associated with the donor eNode-B during the initial entry procedure of the RN. In more detail, a half front symbol and a half rear symbol on the basis of a specific UL backhaul subframe are established as a GP, and UL backhaul is transmitted through 13 or 11 symbols. In this case, as shown in FIG. 25, when a normal CP is used in UL backhaul (i.e., UL subframe of a macro cell), 13 symbols (i.e., 6 symbols of the first slot and 7 symbols of the second slot) from among a total of 14 symbols may be available for UL backhaul transmission. Referring to FIGS. 26 and 27, in case of using the extended CP, 11 symbols (i.e., 5 symbols of the first slot and 6 symbols of the second slot) from among 12 symbols may be available for UL backhaul transmission.

The donor eNode-B may semi-statically allocate one or more PRBs for R-PUCCH transmission, and the allocated PRB(s) may be transmitted to the RN through higher layer signaling. For example, the corresponding higher layer signaling may be cell-specific signaling, and may be broadcast to all RNs contained in a cell. In another example, the higher layer signaling may be RN-specific signaling, and may be unicast to each RN. In order to acquire diversity gain during R-PUCCH transmission, slot hopping may be applied in PRB(s) reserved for R-PUCCH transmission in the same manner as in PUCCH transmission.

In the UL backhaul subframe structure shown in FIGS. 25 to 27, a method for enabling the RN to define R-PUCCH format for R-PUCCH transmission, and a method for allocating the defined R-PUCCH format will hereinafter be described in detail.

R-PUCCH format 1 may be used for ACK/NACK feedback, and may be classified into three formats (i.e., R-PUCCH format 1a, R-PUCCH format 1b, and R-PUCCH format 1c) according to the number of feedback bits. R-PUCCH format 1a may be used for 1-bit ACK/NACK feedback for one codeword, and may create a symbol through Binary Phase Shift Keying (BPSK) modulation. R-PUCCH format 1b may be used for 2-bit ACK/NACK feedback for 2 codewords, and may create a symbol through Quadrature Phase Shift Keying (QPSK) modulation. R-PUCCH format 1c may be used for 4-bit ACK/NACK feedback for 4 codewords, and may create a symbol through 16QAM (Quadrature Amplitude Modulation).

R-PUCCH format 1a to 1c may apply a CAZAC sequence having the length of 12 to BPSK/QPSK/16QAM modulated symbols, so that the application result may be applied to each of 12 subcarriers of one symbol contained in one PRB. In this case, a cyclic shift of the sequence may be changed between a symbol and a slot.

In case of block wise spreading, a process for applying an orthogonal code in a time domain may be determined according to a DM RS allocation method and a cyclic prefix (CP) length.

Figure 28:
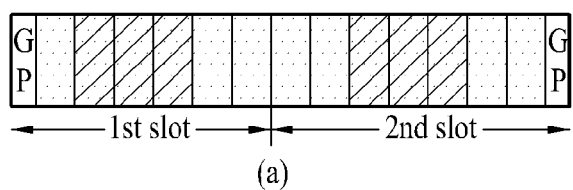
FIG. 28 is a diagram illustrating an example of a DM RS pattern based on an R-PUCCH format 1 for use in a UL backhaul subframe structure shown in FIGS. 25 to 27.
Figure 28:
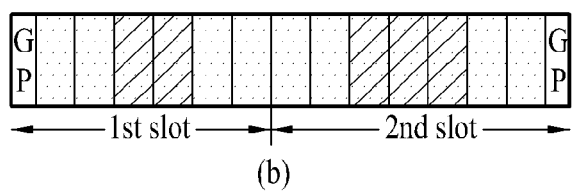
Figure 28:
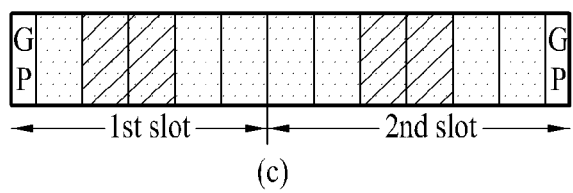
Figure 28:
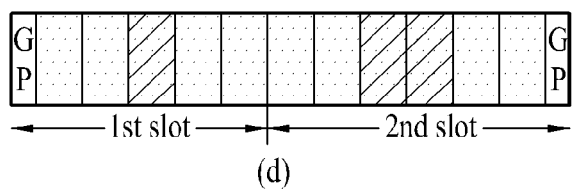

FIG. 28 is a diagram illustrating an example of a DM RS pattern based on an R-PUCCH format 1 for use in a UL backhaul subframe structure shown in FIGS. 25 to 27.

Referring to FIG. 28(a), in case of using the normal CP, a DFT sequence having the length of 3 may be used as an orthogonal sequence for a DM RS of each slot and ACK/NACK information of the first slot. In addition, a hadamard sequence having the length of 4 may be used as an orthogonal code sequence for ACK/NACK feedback information of the second slot.

Referring to FIG. 28(b), in case of using the normal CP, a hadamard sequence having the length of 2 may be used as an orthogonal sequence for a DM RS of the first slot, a DFT sequence having the length of 3 may be used as an orthogonal sequence for a DM RS of the second slot, and a hadamard sequence having the length of 4 may be used as an orthogonal sequence for ACK/NACK information for each slot.

Referring to FIG. 28(c), in case of using the extended CP, a DFT sequence having the length of 2 may be used as an orthogonal sequence for a DM RS of each slot. A DFT sequence having the length of 3 may be used as an orthogonal sequence of ACK/NACK information of the first slot, and a hadamard sequence having the length of 4 may be used as an orthogonal sequence for ACK/NACK information of the second slot.

Referring to FIG. 28(d), in case of using the extended CP, a hadamard sequence having the length of 2 may be used for DM RS of the second slot, and a hadamard sequence having the length of 4 may be used as an orthogonal sequence for ACK/NACK information of each slot.

However, in all the four cases shown in FIGS. 28(a) to 28(d), when the RN transmits a sounding reference signal (SRS) through the last symbol, the shortened ACK/NACK format may be applied to the second slot. That is, the last ACK/NACK symbol of the last second slot is punctured, and a DFT orthogonal sequence having the length of 3 may be applied to the remaining three ACK/NACK symbols of the second slot.

R-PUCCH format 1 may be allocated by the eNode-B. The eNode-B may inform each RN of R-PUCCH resource allocation information and sequence information through higher layer signaling. Several R-PUCCH resources and sequences may be allocated to one RN in such a manner that the eNode-B can support a maximum number of codewords capable of being transmitted through a downlink R-PDSCH according to RN capacity (e.g., antenna configuration, etc.) and a quality of a link between the eNode-B and the RN. In addition, R-PUCCH format 1c may be selectively used by each RN according to a backhaul link quality. In this case, R-PUCCH resources and sequences allocated to one RN may be changed according to whether R-PUCCH format 1c is used or not.

Additional PRB(s) may not be allocated for transmission of the R-PUCCH format 1, and LTE PUCCH multiplexing is performed in PRB(s) in which LTE PUCCH transmission is achieved, so that the RN may transmit ACK/NACK feedback. However, in this case, R-PUCCH transmission of the RN is achieved only through a second slot. In this case, the DM RS may be transmitted as a pattern corresponding to the second slot shown in FIG. 28(a). However, in the case of using the extended CP, DM RS may be transmitted as a pattern corresponding to the second slot shown in FIG. 28(c). In order to allow one RN to further guarantee a QoS for ACK/NACK transmission, one ACK/NACK feedback signaling may be transmitted through several PRBs of the second slot.

R-PUCCH format 2 may be used for CQI feedback transmission. For the modulation scheme, QPSK or 16QAM may be used. R-PUCCH format 2 may apply the CAZAC sequence having the length of 12 to a QPSK or 16QAM modulated symbol, so that the application result may be loaded on each of 12 subcarriers of one symbol in one PRB. In this case, a cyclic shift of the sequence may be changed between a symbol and a slot.

Figure 29:
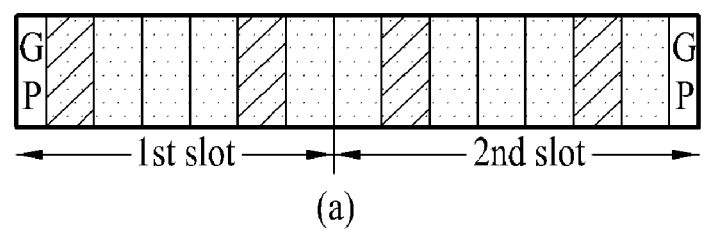
FIGS. 29 and 30 are diagrams illustrating an example of a DM RS pattern based on an R-PUCCH format 2 for use in a UL backhaul subframe structure in case of using a normal CP.
Figure 29:
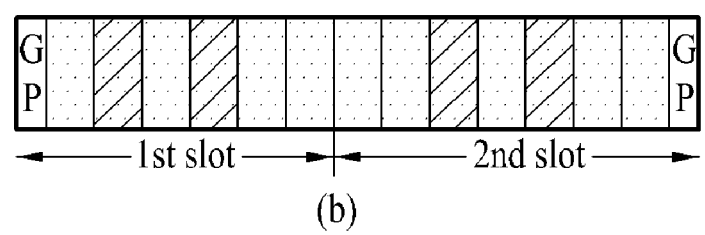
Figure 30:
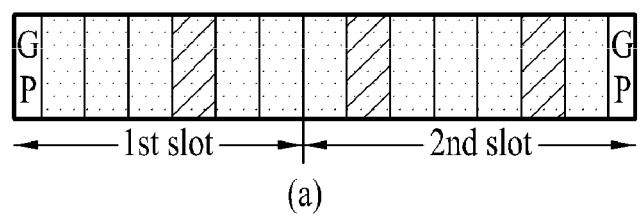
Figure 30:
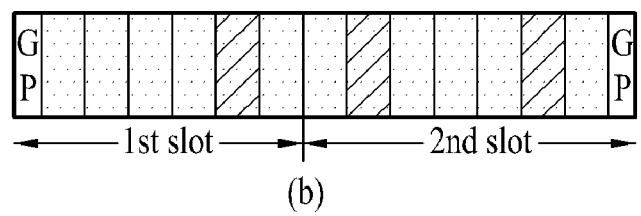
Figure 30:
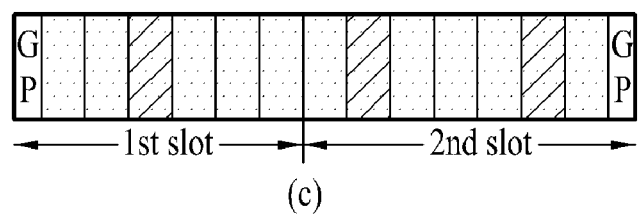

FIGS. 29 and 30 are diagrams illustrating an example of a DM RS pattern based on an R-PUCCH format 2 for use in a UL backhaul subframe structure in case of using a normal CP.

In FIG. 29, a DM RS may be located at one arbitrary symbol in each of the first and second slots. The position of the DM RS shown in FIG. 29 is disclosed only for illustrative purposes. The RN may transmit a DM RS to the eNode-B using one arbitrary symbol in each of the first and second slots. In this case, when the RN transmits a CQI, the modulation scheme may be encoded into the (18,A) simplex code (QPSK) or the (36,A) simplex code (16QAM), and then transmitted.

In FIG. 30, a DM RS may be located either at one arbitrary symbol in the first slot or at two arbitrary symbols in the second slot. That is, the RN may transmit a DM RS to the eNode-B using one arbitrary symbol in the first slot or using two arbitrary symbols in the second slot. The position of the DM RS shown in FIG. 30 is disclosed only for illustrative purposes. When the RN transmits a CQI, the modulation scheme may be encoded into the (20,A) simplex code (QPSK) or the (40,A) simplex code (16QAM), and then transmitted.

Figure 31:
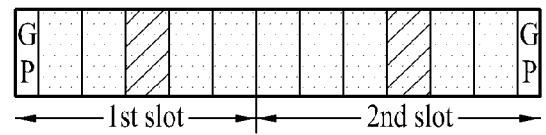
FIG. 31 is a diagram illustrating an example of a DM RS pattern based on an R-PUCCH format 2 for use in a UL backhaul subframe structure in case of using an extended CP.

FIG. 31 is a diagram illustrating an example of a DM RS pattern based on an R-PUCCH format 2 for use in a UL backhaul subframe structure in case of using an extended CP.

In FIG. 31, a DM RS may be located at one arbitrary symbol for each slot in each of the first and second slots. That is, the RN may transmit DM RS to the eNode-B using one arbitrary symbol in each of the first and second slots. The position of the DM RS shown in FIG. 31 is disclosed only for illustrative purposes. When the RN transmits a CQI, the modulation scheme may be encoded into the (18,A) simplex code (QPSK) or the (36,A) simplex code (16QAM), and then transmitted.

R-PUCCH format 2 may be allocated by the eNode-B. The eNode-B may inform each RN of dedicated R-PUCCH resource allocation information and sequence information through higher layer signaling. The R-PUCCH format 2 modulation scheme may be established for each RN and then allocated.

Figure 32:
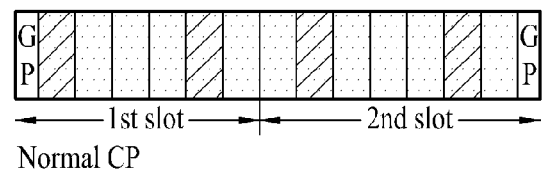
FIG. 32(a) is a diagram illustrating an example of a DM RS pattern based on an R-PUCCH format 2 for use in a UL backhaul subframe structure in case of using a normal CP.
FIG. 32(b) is a diagram illustrating an example of a DM RS pattern based on an R-PUCCH format 2 for use in a UL backhaul subframe structure in case of using an extended CP.
Figure 32:
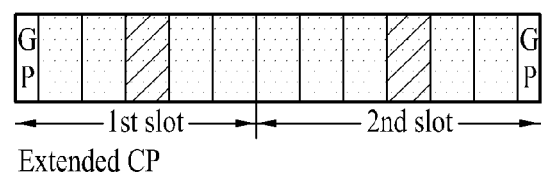

For R-PUCCH format 2 transmission, the RN may not allocate additional PRB(s), and LTE PUCCH multiplexing is performed in PRB(s) in which LTE PUCCH transmission is achieved, so that the RN may transmit ACK/NACK feedback. In this case, a DM RS pattern transmitted through a PUCCH by the RN is shown in FIG. 32.

FIG. 32(a) is a diagram illustrating an example of a DM RS pattern based on an R-PUCCH format 2 for use in a UL backhaul subframe structure in case of using a normal CP, and FIG. 32(b) is a diagram illustrating an example of a DM RS pattern based on an R-PUCCH format 2 for use in a UL backhaul subframe structure in case of using an extended CP.

Referring to FIG. 32(a), in case of using the normal CP, a DM RS may be located at two arbitrary symbols in each of the first and second slots. That is, the RN may transmit the DM RS to the eNode-B through two arbitrary symbols in each of the first and second slots. The position of the DM RS shown in FIG. 32(a) is disclosed only for illustrative purposes. Referring to FIG. 32(b), in case of using the extended CP, a DM RS may be located at one arbitrary symbol in each of the first and second slots. In other words, the RN may transmit the DM RS to the eNode-B through one arbitrary symbol in each of the first and second slots. In addition, the structure shown in FIG. 32(b) is disclosed only for illustrative purposes. In this case, when the RN transmits a CQI feedback, the modulation scheme may be encoded into the (18,A) simplex code or the (36,A) simplex code, and then transmitted. In addition, one RN may be transmitted through several PRBs.

The RN may reuse the ACK/NACK format so as to transmit a scheduling request (SR) channel. Based on the ACK/NACK channel, on-off keying scheme may be used.

Figure 33:
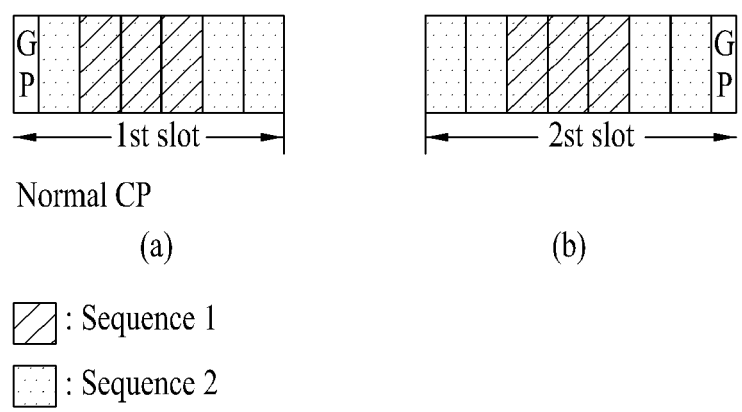
FIG. 33 is a diagram illustrating transmission of a scheduling request (SR) channel in a UL backhaul subframe structure shown in FIGS. 25 to 27.

FIG. 33 is a diagram illustrating transmission of a scheduling request (SR) channel in a UL backhaul subframe structure shown in FIGS. 25 to 27.

Referring to FIG. 33, in the case of using the normal CP, an orthogonal sequence having the length of 6 may be divided into two orthogonal sequences in the first slot, and an orthogonal sequence having the length of 7 may be divided into two orthogonal sequences in the second slot.

Figure 34:
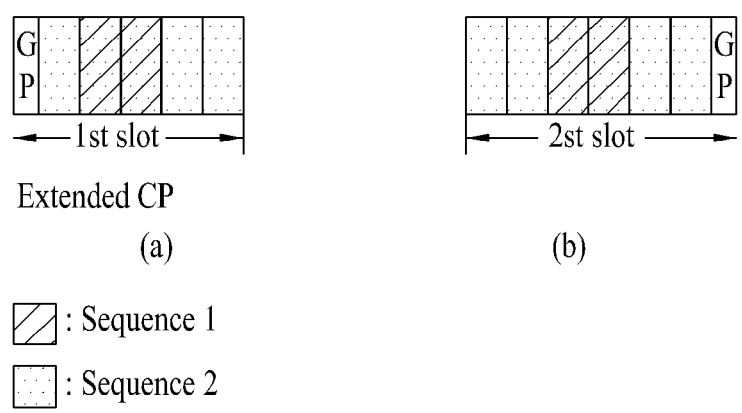
FIG. 34 is a diagram illustrating transmission of a scheduling request (SR) channel in a UL backhaul subframe structure shown in FIGS. 25 to 27.

FIG. 34 is a diagram illustrating transmission of a scheduling request (SR) channel in a UL backhaul subframe structure shown in FIGS. 25 to 27.

Referring to FIG. 34, in the case of using the extended CP, an orthogonal sequence having the length of 5 may be divided into two orthogonal sequences in the first slot, and an orthogonal sequence having the length of 6 may be divided into two orthogonal sequences in the second slot.

In order to enable the RN to transmit the scheduling request (SR) signal, additional PRB(s) may not be allocated, and PUCCH resources for LTE PUCCH format 1 may be reused. In this case, in case of using the normal CP, the RN may transmit the SR signal only through a symbol corresponding to the first sequence having the length of 3 shown in FIG. 33(a). Alternatively, in case of the second slot shown in FIG. 33(b), only a symbol corresponding to a first sequence having the length of 3 may be transmitted, or a second sequence having the length of 4 may also be transmitted.

In contrast to FIG. 33, in case of using the extended CP, the RN may transmit a scheduling request (SR) signal only through a symbol corresponding to a first sequence having the length of 2 as shown in FIG. 34(a). Otherwise, in case of the second slot shown in FIG. 34(b), only a symbol corresponding to a first sequence having the length of 2 may be transmitted, or a second sequence having the length of 4 may also be transmitted.

However, the ACK/NACK format is reused, and is divided into a DM RS and an information symbol. The ACK/NACK format may include all the cases of the above-mentioned R-PUCCH format 1. The modulation scheme may be QPSK or 16QAM (or 64QAM). The information symbol may include information regarding a quantized buffer state (for example, if the modulation scheme is a QPSK, 2 bits may display quantized buffer state information having 4 levels) according to a modulation scheme. Therefore, a donor eNode-B may determine the amount of uplink resources that are allocated to the RN by the donor eNode-B.

In contrast, the RN may reuse R-PUCCH format 2 to transmit a scheduling request (SR) channel. The RN may use the R-PUCCH format 2 structure for CQI feedback, and may feed back the quantized buffer state information instead of the CQI through the information symbol.

However, the RN may allocate the SR channel to each RN. In this case, the RN may transmit at least one of SR channel resources, resource index, and modulation scheme to each RN through higher layer signaling.

Figure 35:
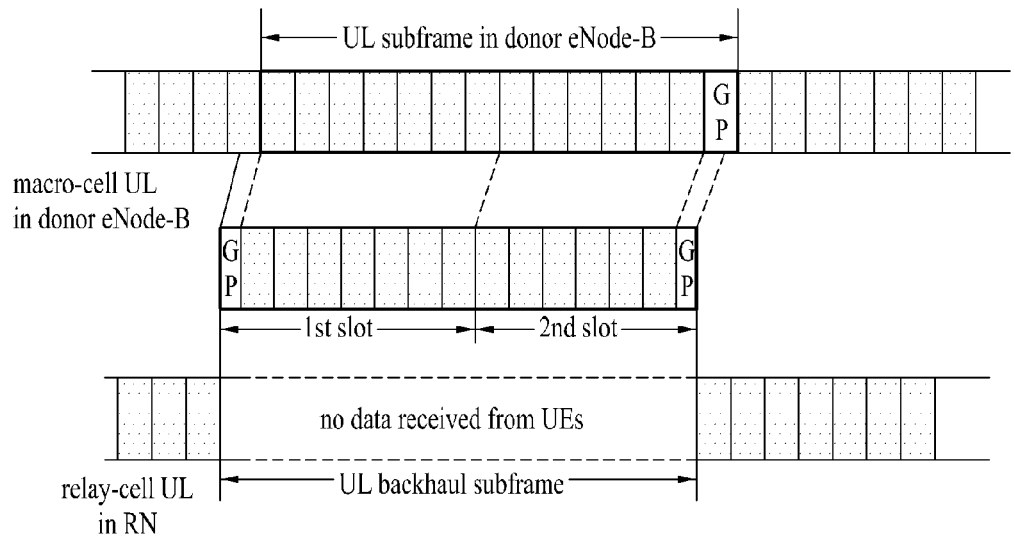
FIGS. 35 to 37 are diagrams illustrating in which UL timing of a relay node (RN) is shifted (or advanced) by a half symbol (0.5 symbol) as compared to UL backhaul subframe reception timing of an eNode-B.
Figure 36:
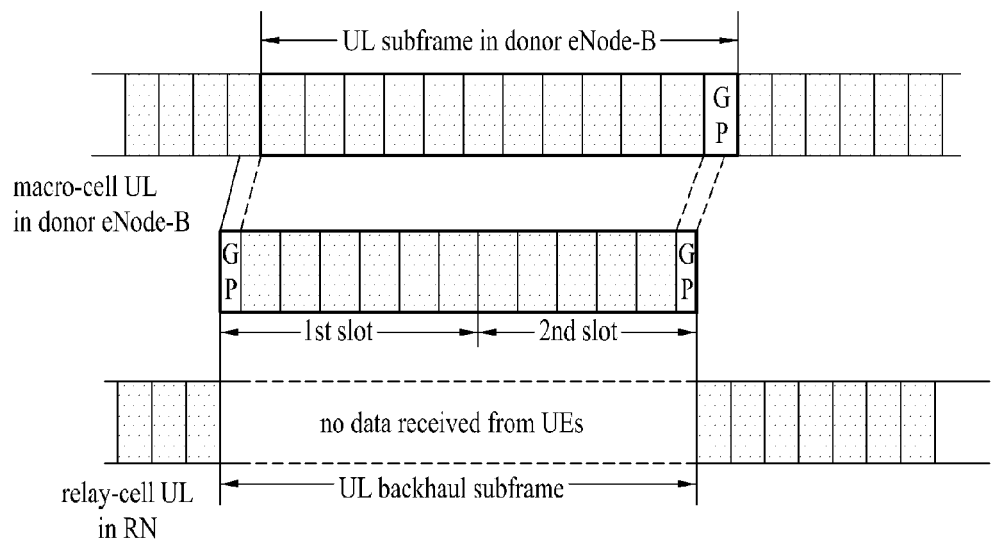
Figure 37:
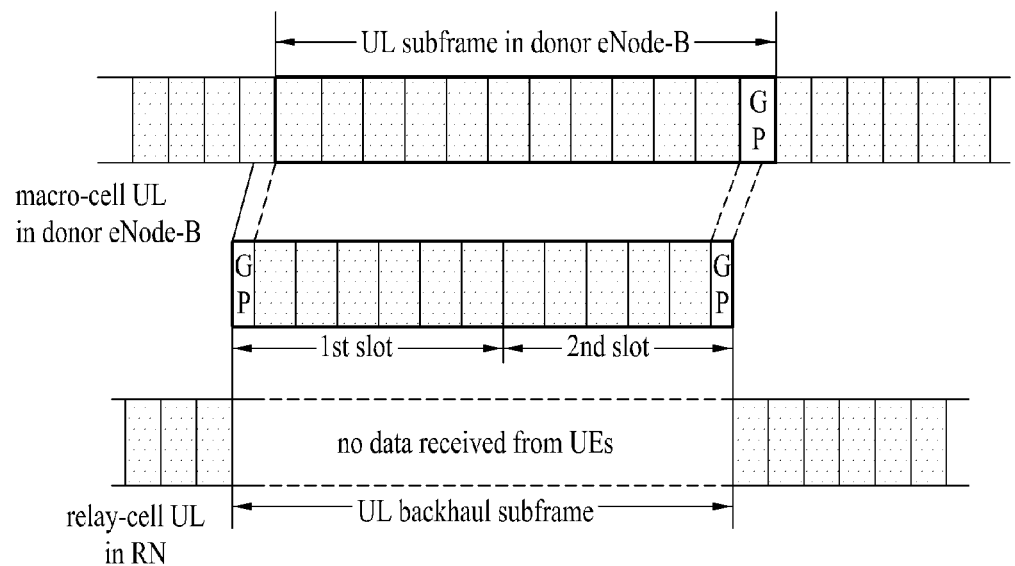

FIGS. 35 to 37 are diagrams illustrating in which UL timing of a relay node (RN) is shifted (or advanced) by a half symbol (0.5 symbol) as compared to UL backhaul subframe reception timing of an eNode-B.

As can be seen from FIGS. 35 to 37, UL subframe timing of the RN is synchronized in response to a specific value acquired when a ½ symbol length is subtracted from a UL timing advance value adjusted through a random access procedure associated with the donor eNode-B during the initial entry procedure of the RN. In more detail, a half front symbol and a half rear symbol on the basis of a specific UL backhaul subframe are established as a GP, and UL backhaul is transmitted through 13 or 11 symbols. In this case, as shown in FIG. 35, when a normal CP is used in UL backhaul (i.e., UL subframe of a macro cell), 13 symbols (i.e., 7 symbols of the first slot and 6 symbols of the second slot) from among a total of 14 symbols may be available for UL backhaul transmission. Referring to FIGS. 36 and 37, in case of using the extended CP, 11 symbols (i.e., 6 symbols of the first slot and 5 symbols of the second slot) from among 12 symbols may be available for UL backhaul transmission.

The donor eNode-B may semi-statically allocate one or more PRBs for R-PUCCH transmission, and the allocated PRB(s) may be transmitted to the RN through higher layer signaling. For example, the corresponding higher layer signaling may be cell-specific signaling, and may be broadcast to all RNs contained in a cell. In another example, the higher layer signaling may be RN-specific signaling, and may be unicast to each RN. In order to acquire diversity gain during R-PUCCH transmission, slot hopping may be applied in PRB(s) reserved for R-PUCCH transmission in the same manner as in PUCCH transmission.

In the UL backhaul subframe structure shown in FIGS. 35 to 37, a method for enabling the RN to define R-PUCCH format for R-PUCCH transmission, and a method for allocating the defined R-PUCCH format will hereinafter be described in detail.

R-PUCCH format 1 may be used for ACK/NACK feedback, and may be classified into three formats (i.e., R-PUCCH format 1a, R-PUCCH format 1b, and R-PUCCH format 1c) according to the number of feedback bits. R-PUCCH format 1a may be used for 1-bit ACK/NACK feedback for one codeword, and may create a symbol through Binary Phase Shift Keying (BPSK) modulation. R-PUCCH format 1b may be used for 2-bit ACK/NACK feedback for 2 codewords, and may create a symbol through Quadrature Phase Shift Keying (QPSK) modulation. R-PUCCH format 1c may be used for 4-bit ACK/NACK feedback for 4 codewords, and may create a symbol through 16QAM (Quadrature Amplitude Modulation).

R-PUCCH format 1a to 1c may apply a CAZAC sequence having the length of 12 to BPSK/QPSK/16QAM modulated symbols, so that the application result may be applied to each of 12 subcarriers of one symbol contained in one PRB. In this case, a cyclic shift of the sequence may be changed between a symbol and a slot.

In case of block wise spreading, a process for applying an orthogonal code in a time domain may be determined according to a DM RS allocation method and a cyclic prefix (CP) length.

Figure 38:
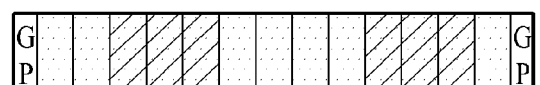
FIG. 38 is a diagram illustrating an example of a DM RS pattern based on an R-PUCCH format 1 for use in a UL backhaul subframe structure shown in FIGS. 35 to 37.
Figure 38:
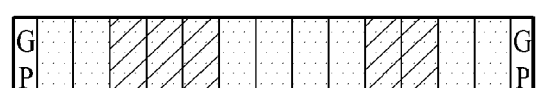
Figure 38:
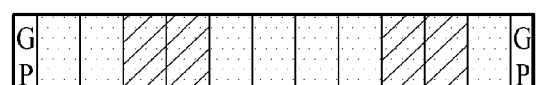
Figure 38:
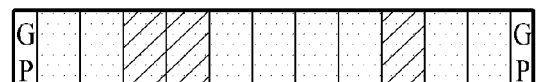

FIG. 38 is a diagram illustrating an example of a DM RS pattern based on an R-PUCCH format 1 for use in a UL backhaul subframe structure shown in FIGS. 35 to 37.

Referring to FIG. 38(a), in case of using the normal CP, a DFT sequence having the length of 3 may be used as an orthogonal sequence for a DM RS of each slot and ACK/NACK information of the second slot. In addition, a hadamard sequence having the length of 4 may be used as an orthogonal code sequence for ACK/NACK feedback information of the first slot.

Referring to FIG. 38(b), in case of using the normal CP, a DFT sequence having the length of 3 may be used as an orthogonal sequence for a DM RS of the first slot, a hadamard sequence having the length of 2 may be used as an orthogonal sequence for a DM RS of the second slot, and a hadamard sequence having the length of 4 may be used as an orthogonal sequence for ACK/NACK information for each slot.

Referring to FIG. 38(c), in case of using the extended CP, a hadamard sequence having the length of 2 may be used as an orthogonal sequence for a DM RS of each slot. A hadamard sequence having the length of 4 may be used as an orthogonal sequence of ACK/NACK information of the first slot, and a DFT sequence having the length of 3 may be used as an orthogonal sequence for ACK/NACK information of the second slot.

Referring to FIG. 38(d), in case of using the extended CP, a hadamard sequence having the length of 2 may be used for DM RS of the first slot, and a hadamard sequence having the length of 4 may be used as an orthogonal sequence for ACK/NACK information of each slot.

However, in all the four cases shown in FIGS. 38(a) to 38(d), when the RN transmits a sounding reference signal (SRS) through the last symbol, the shortened ACK/NACK format may be applied to the first slot. That is, the last ACK/NACK symbol of the last first slot is punctured, and a DFT orthogonal sequence having the length of 3 may be applied to the remaining three ACK/NACK symbols of the first slot. Alternatively, when the RN transmits the SRS through the first symbol of the first slot, the shortened ACK/NACK format may be used. In this case, the first symbol may be punctured, and a DFT orthogonal sequence having the length of 3 may be applied to the remaining three ACK/NACK symbols.

R-PUCCH format 1 may be allocated by the eNode-B. The eNode-B may inform each RN of R-PUCCH resource allocation information and sequence information through higher layer signaling. Several R-PUCCH resources and sequences may be allocated to one RN in such a manner that the eNode-B can support a maximum number of codewords capable of being transmitted through a downlink R-PDSCH according to RN capacity (e.g., antenna configuration, etc.) and a quality of a link between the eNode-B and the RN. In addition, R-PUCCH format 1c may be selectively used by each RN according to a backhaul link quality. In this case, R-PUCCH resources and sequences allocated to one RN may be changed according to whether R-PUCCH format 1c is used or not.

Additional PRB(s) may not be allocated for transmission of the R-PUCCH format 1, and LTE PUCCH multiplexing is performed in PRB(s) in which LTE PUCCH transmission is achieved, so that the RN may transmit ACK/NACK feedback. However, in this case, R-PUCCH transmission of the RN is achieved only through the first slot. In this case, the DM RS may be transmitted as a pattern corresponding to the first slot shown in FIGS. 38(a) to 38(d). In order to allow one RN to further guarantee a QoS for ACK/NACK transmission, one ACK/NACK feedback signaling may be transmitted through several PRBs of the second slot. Alternatively, the format shown in FIG. 38(a) illustrating the example of using the normal CP and the format shown in FIG. 38(c) illustrating the example of using the extended CP may be transmitted through LTE PUCCH. In this case, the eNode-B may allow macro UEs to transmit data using the shortened ACK/NACK format in case of the second slot.

R-PUCCH format 2 may be used for CQI feedback transmission. For the modulation scheme, QPSK or 16QAM may be used. R-PUCCH format 2 may apply the CAZAC sequence having the length of 12 to a QPSK or 16QAM modulated symbol, so that the application result may be loaded on each of 12 subcarriers of one symbol in one PRB. In this case, a cyclic shift of the sequence may be changed between a symbol and a slot.

Figure 39:
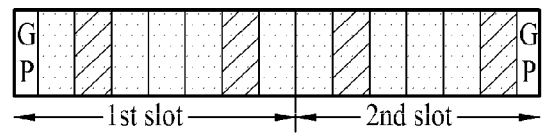
FIGS. 39 and 40 are diagrams illustrating an example of a DM RS pattern based on an R-PUCCH format 2 for use in a UL backhaul subframe structure in case of using a normal CP.
Figure 40:
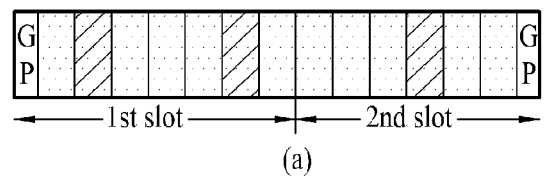
Figure 40:
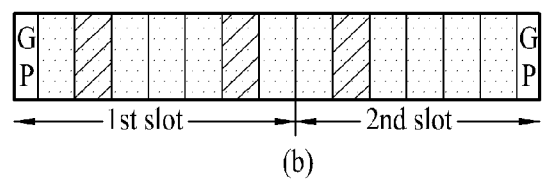

FIGS. 39 and 40 are diagrams illustrating an example of a DM RS pattern based on an R-PUCCH format 2 for use in a UL backhaul subframe structure in case of using a normal CP.

In FIG. 39, a DM RS may be located at two arbitrary symbols in each of the first and second slots. That is, the RN may transmit DM RS to the eNode-B using two arbitrary symbols in each of the first and second slots. The position of the DM RS shown in FIG. 39 is disclosed only for illustrative purposes. When the RN transmits a CQI, the modulation scheme may be encoded into the (18,A) simplex code (QPSK) or the (36,A) simplex code (16QAM), and then transmitted.

In FIG. 40, a DM RS may be located either at two arbitrary symbols in the first slot or at one arbitrary symbol in the second slot. That is, the RN may transmit a DM RS to the eNode-B using two arbitrary symbols in the first slot or using one arbitrary symbol in the second slot. The position of the DM RS shown in FIG. 40 is disclosed only for illustrative purposes. When the RN transmits a CQI, the modulation scheme may be encoded into the (20,A) simplex code (QPSK) or the (40,A) simplex code (16QAM), and then transmitted.

Figure 41:
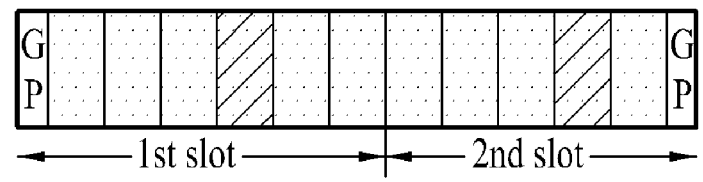
FIG. 41 is a diagram illustrating an example of a DM RS pattern based on an R-PUCCH format 2 for use in a UL backhaul subframe structure in case of using an extended CP.

FIG. 41 is a diagram illustrating an example of a DM RS pattern based on an R-PUCCH format 2 for use in a UL backhaul subframe structure in case of using an extended CP.

In FIG. 41, a DM RS may be located at one arbitrary symbol for each slot in each of the first and second slots. That is, the RN may transmit DM RS to the eNode-B using one arbitrary symbol in each of the first and second slots. The position of the DM RS shown in FIG. 41 is disclosed only for illustrative purposes. When the RN transmits a CQI, the modulation scheme may be encoded into the (18,A) simplex code (QPSK) or the (36,A) simplex code (16QAM), and then transmitted.

R-PUCCH format 2 may be allocated by the eNode-B. The eNode-B may inform each RN of dedicated R-PUCCH resource allocation information and sequence information through higher layer signaling. The R-PUCCH format 2 modulation scheme may be established for each RN and then allocated.

Figure 42:
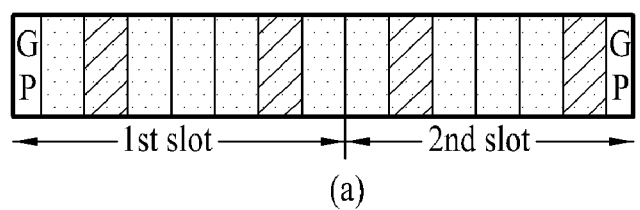
FIG. 42(a) is a diagram illustrating an example of a DM RS pattern based on an R-PUCCH format 2 for use in a UL backhaul subframe structure in case of using a normal CP.
FIG. 42(b) is a diagram illustrating an example of a DM RS pattern based on an R-PUCCH format 2 for use in a UL backhaul subframe structure in case of using an extended CP.
Figure 42:
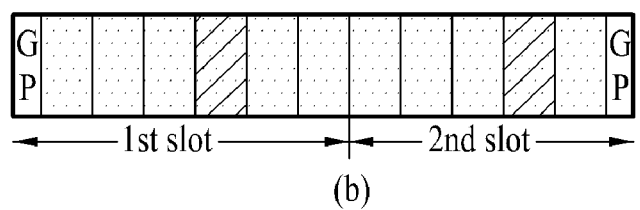

For R-PUCCH format 2 transmission, the RN may not allocate additional PRB(s), and LTE PUCCH multiplexing is performed in PRB(s) in which LTE PUCCH transmission is achieved, so that the RN may transmit ACK/NACK feedback. In this case, a DM RS pattern transmitted through a PUCCH by the RN is shown in FIG. 42.

FIG. 42(a) is a diagram illustrating an example of a DM RS pattern based on an R-PUCCH format 2 for use in a UL backhaul subframe structure in case of using a normal CP, and FIG. 42(b) is a diagram illustrating an example of a DM RS pattern based on an R-PUCCH format 2 for use in a UL backhaul subframe structure in case of using an extended CP.

Referring to FIG. 42(a), in case of using the normal CP, a DM RS may be located at two arbitrary symbols in each of the first and second slots. That is, the RN may transmit the DM RS to the eNode-B through two arbitrary symbols in each of the first and second slots. The position of the DM RS shown in FIG. 42(a) is disclosed only for illustrative purposes. Referring to FIG. 42(b), in case of using the extended CP, a DM RS may be located at one arbitrary symbol in each of the first and second slots. In other words, the RN may transmit the DM RS to the eNode-B through one arbitrary symbol in each of the first and second slots. In addition, the structure shown in FIG. 42(b) is disclosed only for illustrative purposes. In this case, when the RN transmits a CQI feedback, the modulation scheme may be encoded into the (18,A) simplex code or the (36,A) simplex code, and then transmitted. In addition, one RN may be transmitted through several PRBs.

The RN may reuse the ACK/NACK format so as to transmit a scheduling request (SR) channel. Based on the ACK/NACK channel, on-off keying scheme may be used.

Figure 43:
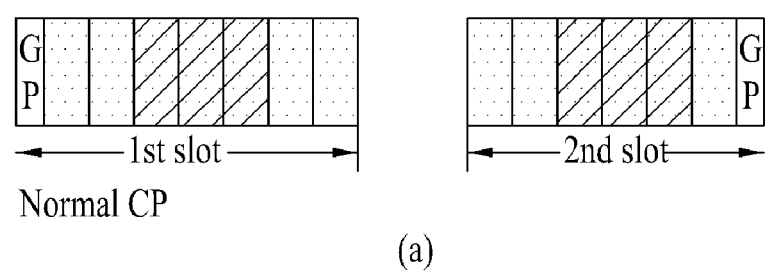
FIG. 43 is a diagram illustrating transmission of a scheduling request (SR) channel in a UL backhaul subframe structure shown in FIGS. 35 to 37.
Figure 43:
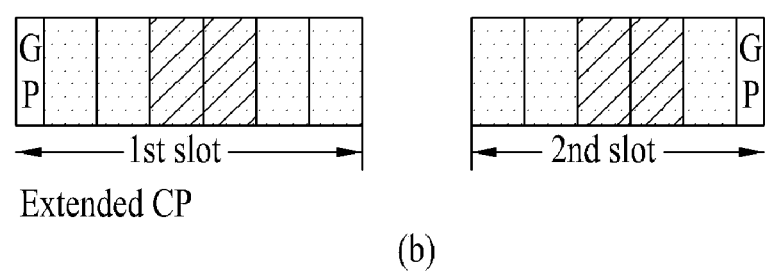

FIG. 43 is a diagram illustrating transmission of a scheduling request (SR) channel in a UL backhaul subframe structure shown in FIGS. 35 to 37.

Referring to FIG. 43(a), in the case of using the normal CP, an orthogonal sequence having the length of 7 may be divided into two orthogonal sequences in the first slot, and an orthogonal sequence having the length of 6 may be divided into two orthogonal sequences in the second slot.

Referring to FIG. 43(b), in the case of using the extended CP, an orthogonal sequence having the length of 6 may be divided into two orthogonal sequences in the first slot, and an orthogonal sequence having the length of 5 may be divided into two orthogonal sequences in the second slot.

In order to enable the RN to transmit the scheduling request (SR) signal, additional PRB(s) may not be allocated, and PUCCH resources for LTE PUCCH format 1 may be reused. In this case, in case of using the normal CP, the RN may transmit the SR signal only through a symbol corresponding to the first sequence having the length of 3 shown in FIG. 43(*a*). In other words, the RN may not transmit any signal through a symbol to which the second orthogonal sequence is applied.

In contrast to FIG. 43(*a*), in case of using the extended CP, the RN may transmit a scheduling request (SR) signal only through a symbol corresponding to a first sequence having the length of 2 as shown in FIG. 43(*b*). In other words, the RN may not transmit any signal through a symbol to which the second orthogonal sequence is applied.

However, the ACK/NACK format is reused, and is divided into a DM RS and an information symbol. The ACK/NACK format may include all the cases of the above-mentioned R-PUCCH format 1. The modulation scheme may be QPSK or 16QAM (or 64QAM). The information symbol may include information regarding a quantized buffer state (for example, if the modulation scheme is a QPSK, 2 bits may display quantized buffer state information having 4 levels) according to a modulation scheme. Therefore, a donor eNode-B may determine the amount of uplink resources that are allocated to the RN by the donor eNode-B.

In contrast, the RN may reuse R-PUCCH format 2 to transmit a scheduling request (SR) channel. The RN may use the R-PUCCH format 2 structure for CQI feedback, and may feed back the quantized buffer state information instead of the CQI through the information symbol.

However, the RN may allocate the SR channel to each RN. In this case, the RN may transmit at least one of SR channel resources, resource index, and modulation scheme to each RN through higher layer signaling.

Figure 44:
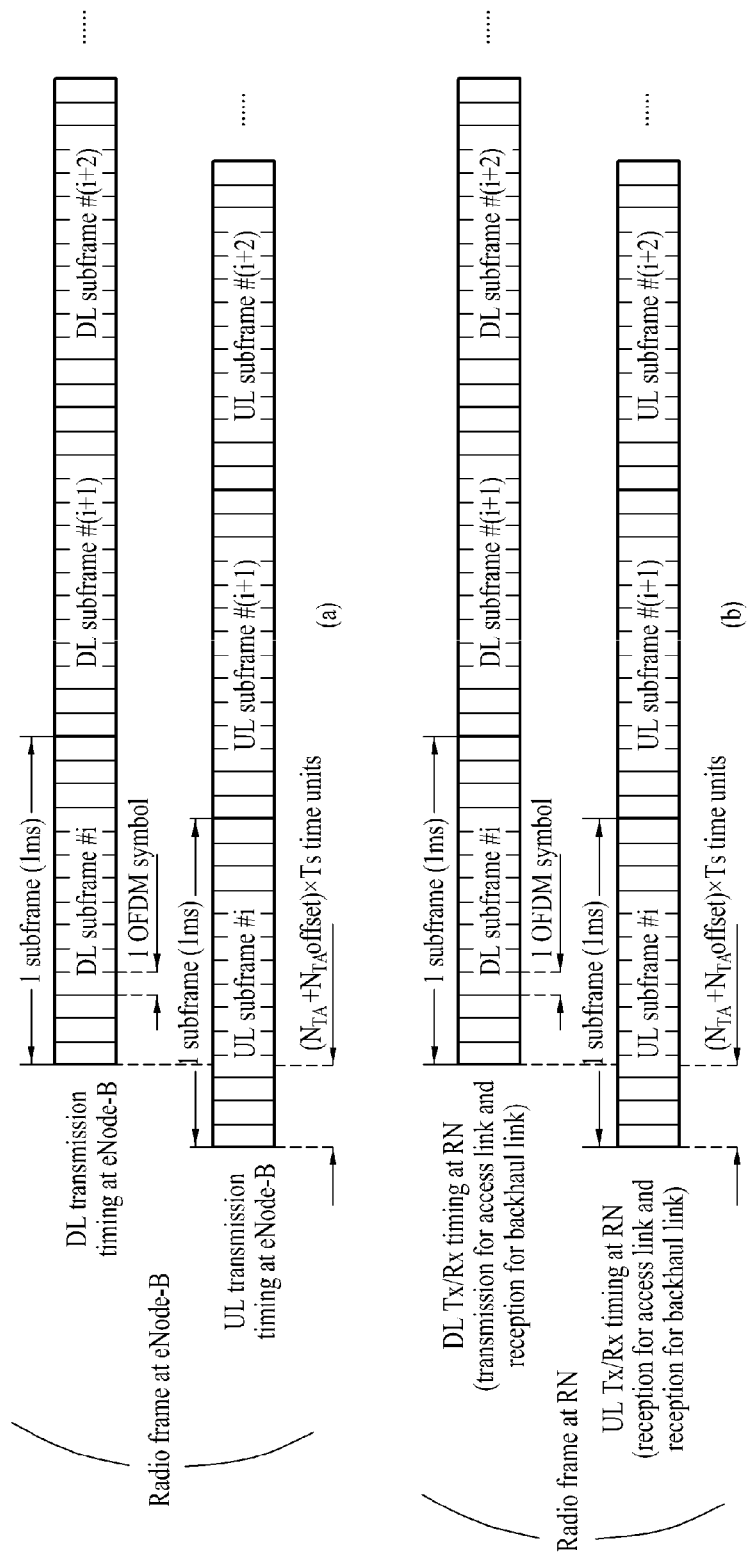
FIG. 44 is a diagram illustrating a frame structure in which UL/DL subframe timing between an eNode-B and an RN is aligned in a straight line.

FIG. 44 is a diagram illustrating a frame structure in which UL/DL subframe timing between an eNode-B and an RN is aligned in a straight line.

Referring to FIG. 44(*a*), UL reception timing at the eNode-B may lead DL transmission timing by a predetermined time denoted by "$(N_{TA}+N_{TAoffset}) \times Ts$". That is, a start point of a UL subframe (i) that receives a UL signal from the UE may lead a start point of the DL subframe (i) that performs DL transmission to the UE by a predetermined time denoted by "$(N_{TA}+N_{TAoffset}) \times Ts$". In this case, $N_{TA}$ is a timing offset between a UL radio frame and a DL radio frame, and is represented in units of Ts. In addition, $N_{TAoffset}$ is a fixed timing advance offset, and is represented in units of Ts. In this case, Ts is a basic time unit. In addition, $N_{TA}$ may be represented by $0 \leq N_{TA} \leq 20512$. In association with the frame structure type 1, $N_{TAoffset}$ may be zero ($N_{TAoffset}=0$). In association with the frame structure type 2, $N_{TAoffset}$ may be 624 ($N_{TAoffset}=624$).

Referring to FIG. 44(*b*), the RN may transmit and receive signals through a backhaul link and an access link in a UL subframe. In this case, UL transmission timing of the RN may lead DL transmission timing of the RN by a predetermined time denoted by "$(N_{TA}+N_{TAoffset}) \times Ts$". In addition, UL transmission timing of the RN may lead DL subframe timing of the eNode-B shown in FIG. 44(*a*) by a predetermined time denoted by "$(N_{TA}+N_{TAoffset}) \times Ts$". Because of a propagation delay caused by UE transmission, UL reception timing of the RN may lead DL transmission timing of the RN.

Figure 45:
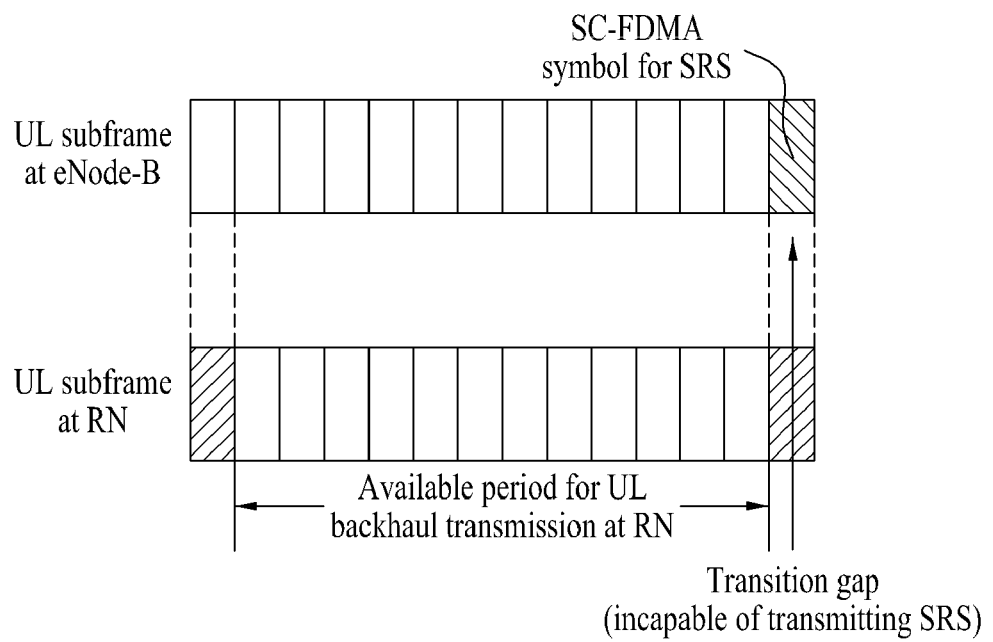
FIG. 45 is a conceptual diagram illustrating UL backhaul subframe operations for use in an eNode-B and an RN according to the concept of FIG. 44.

FIG. 45 is a conceptual diagram illustrating UL backhaul subframe operations for use in an eNode-B and an RN according to the concept of FIG. 44.

It is necessary for the eNode-B to estimate a channel quality of a UL backhaul channel. To accomplish this, the RN may transmit the SRS signal to the eNode-B in an available period for UL backhaul transmission. Specifically, the RN may transmit the SRS to the eNode-B through the last symbol of the UL subframe, and the eNode-B may receive the SRS through the last symbol within a UL subframe. However, if the last symbol is allocated to a transition gap in the UL backhaul subframe of the RN, the RN is unable to transmit the SRS to the eNode-B. In order to solve such problems, structures shown in FIGS. 46 and 47 may be considered.

Figure 46:
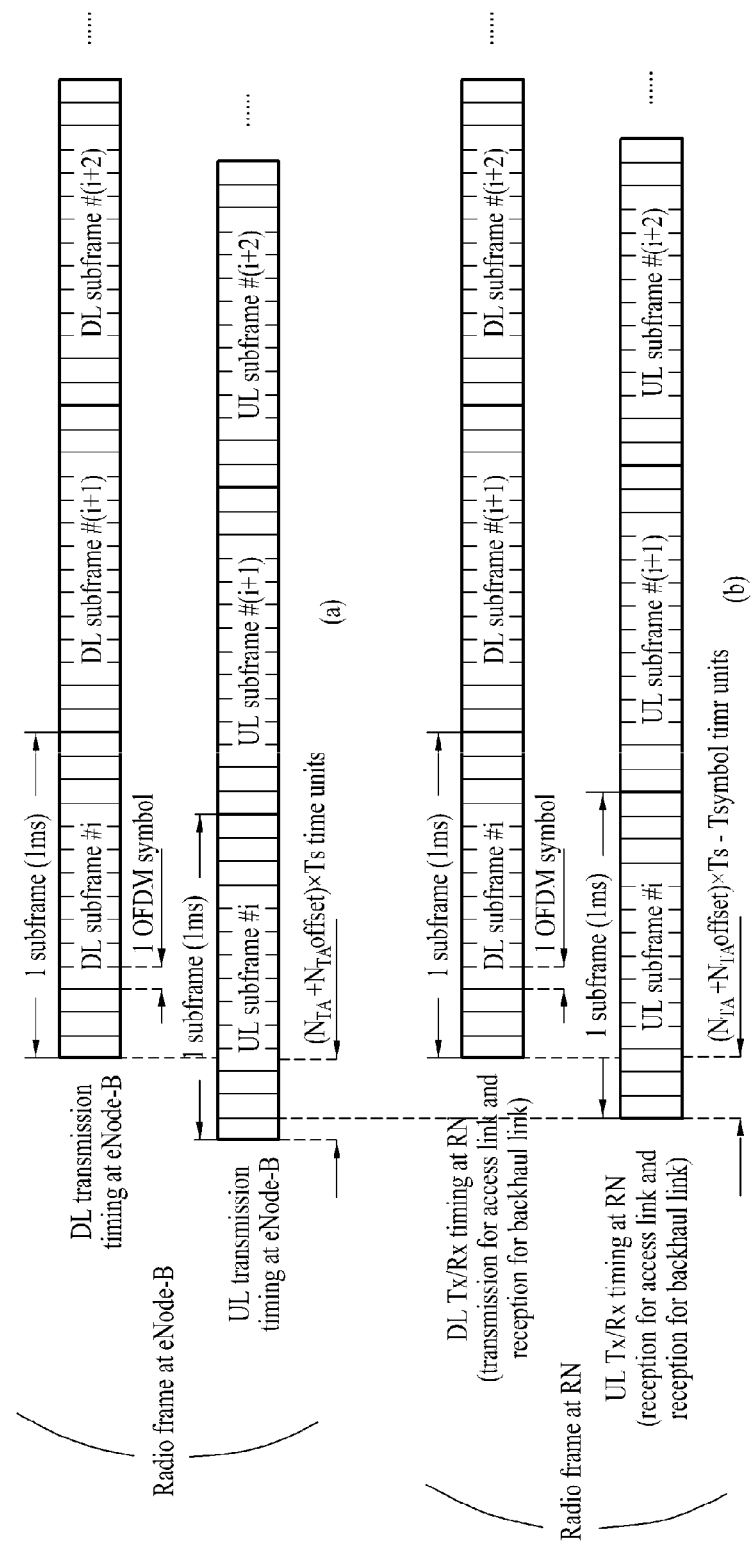
FIG. 46 is a diagram illustrating an example of a frame structure corresponding to a case in which UL/DL subframe timing of an eNode-B and an RN is shifted and established (or timing lagging or leading is established)

FIG. 46 is a diagram illustrating an example of a frame structure corresponding to a case in which UL/DL subframe timing of an eNode-B and an RN is shifted and established (or timing lagging or leading is established).

Referring to FIG. 46(*a*), UL reception timing at the eNode-B may lead DL transmission timing by a predetermined time denoted by "$(N_{TA}+N_{TAoffset}) \times Ts$". That is, a start point of a UL subframe (i) may lead a reception start point of the corresponding DL subframe (i) of the UE by a predetermined time denoted by "$(N_{TA}+N_{TAoffset}) \times Ts$". In the same manner as in FIG. 44, $N_{TA}$ is a timing offset between a UL radio frame and a DL radio frame, and is represented in units of Ts. In addition, $N_{TAoffset}$ is a fixed timing advance offset, and is represented in units of Ts. In this case, Ts is a basic time unit. In addition, $N_{TA}$ may be represented by $0 \leq N_{TA} \leq 20512$. In association with the frame structure type 1, $N_{TAoffset}$ may be zero ($N_{TAoffset}=0$). In association with the frame structure type 2, $N_{TAoffset}$ may be 624 ($N_{TAoffset}=624$).

Referring to FIG. 46(*b*), UL transmission/reception (Tx/Rx) timing of the RN may lead DL transmission Tx/Rx timing of the RN by a predetermined time denoted by "$(N_{TA}+N_{TAoffset}) \times Ts - T_{symbol}$". For example, $T_{symbol}$ may be one symbol. Therefore, UL Tx/Rx timing of the RN shown in FIG. 46(*a*) may lag UL reception timing of the eNode-B by a predetermined time denoted by $T_{symbol}$. That is, a start point of Tx/Rx timing in uplink of the RN may lag UL Rx timing of the eNode-B by a predetermined time denoted by $T_{symbol}$. In contrast, backhaul transmission timing of the RN may lead UL reception timing of the eNode-B by a predetermined time corresponding to one symbol.

Figure 47:
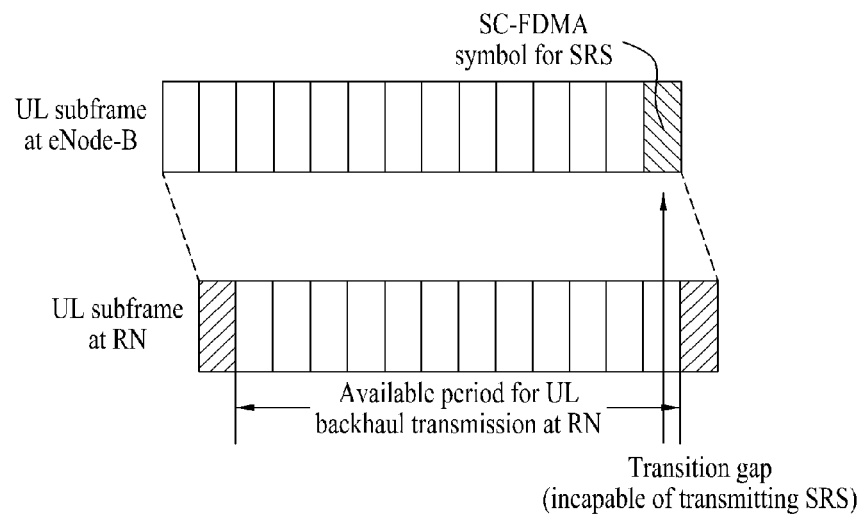
FIG. 47 is a diagram illustrating UL backhaul subframe operations for use in an eNode-B and an RN according to the concept of FIG. 46.
Figure 48:
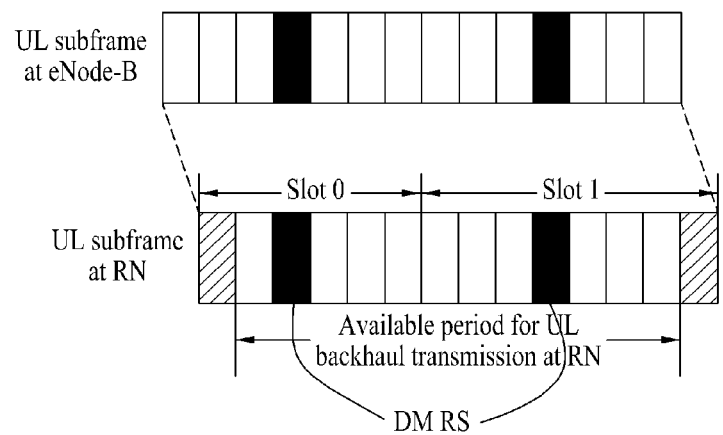
FIGS. 48 to 54 are diagrams illustrating an example of a transmission format structure for use in a UL backhaul subframe of a relay node (RN)
Figure 49:
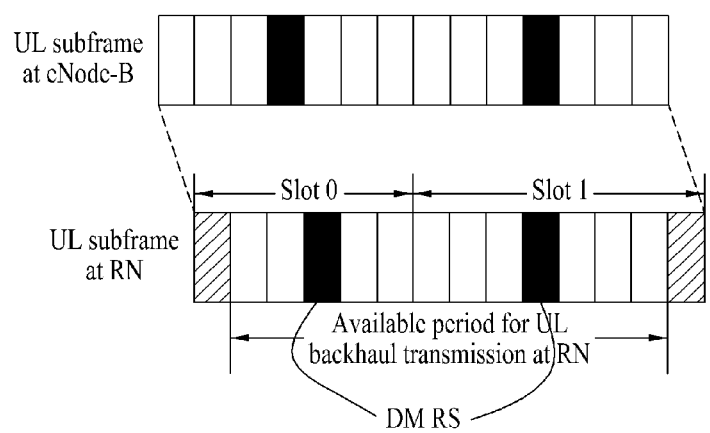
Figure 50:
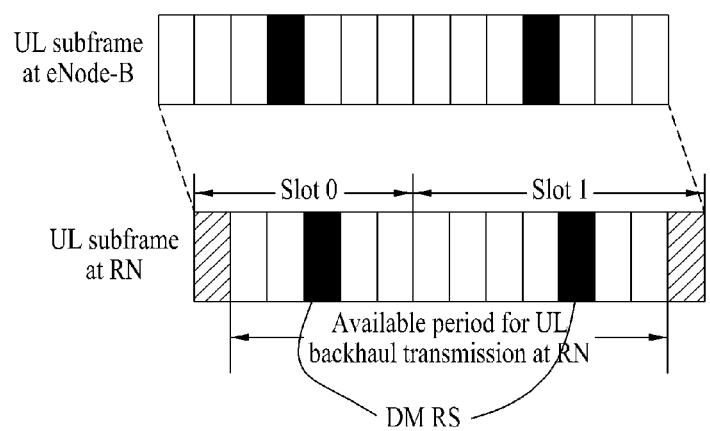
Figure 51:
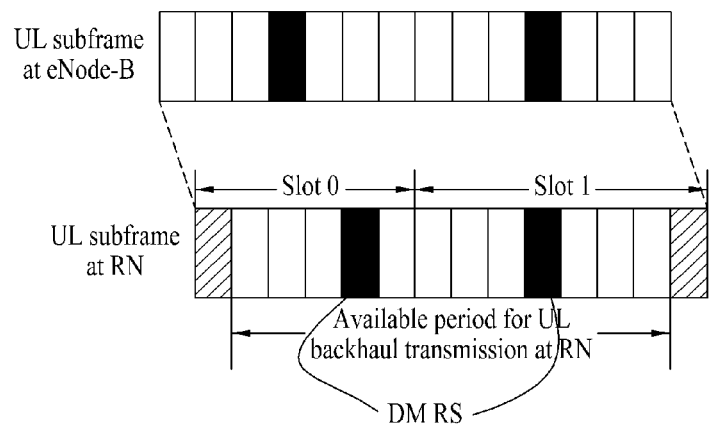
Figure 52:
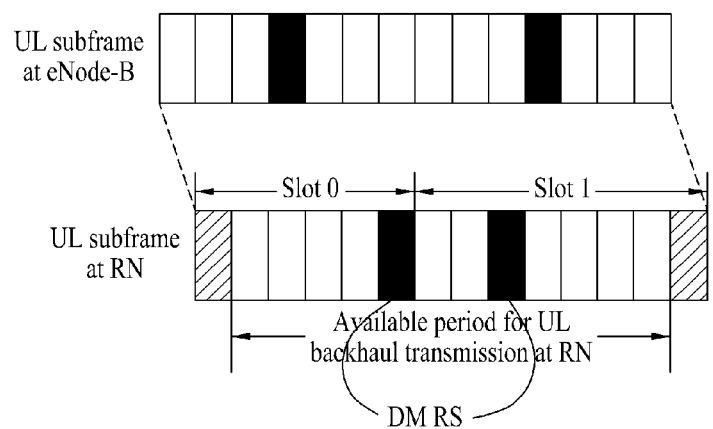

FIG. 47 is a diagram illustrating UL backhaul subframe operations for use in an eNode-B and an RN according to the concept of FIG. 46.

For example, UL Tx/Rx timing of the RN may lag UL reception timing of the eNode-B by a predetermined time corresponding to $T_{symbol}$ (specifically, one symbol), so that the RN can transmit the SRS to the eNode-B in the UL subframe shown in FIG. 47, using a symbol (i.e., a $13^{th}$ symbol) located just before the last symbol, instead of using the last symbol. When the RN transmits the SRS using the $13^{th}$ symbol in a specific UL subframe, the eNode-B may receive the SRS from the RN through the last symbol period in a specific UL subframe. Due to the above-mentioned RN UL subframe timing setting, the problem in which the RN is unable to transmit the SRS can be solved.

The UL subframe timing shifting of the RN will hereinafter be described in detail.

FIGS. 48 to 54 are diagrams illustrating an example of a transmission format structure for use in a UL backhaul subframe of a relay node (RN).

Referring to FIGS. 48 to 54, a first slot (a slot having an index of 0) and a second slot (a slot having an index of 1) may be unevenly configured in a specific UL backhaul subframe of the RN. That is, the slot having the index of 0 may include 6 symbols, and the slot having the index of 1 may include 8 symbols.

Figure 53:
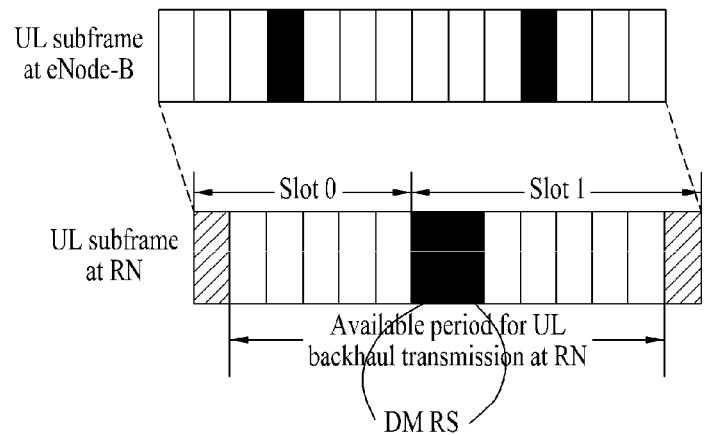
Figure 54:
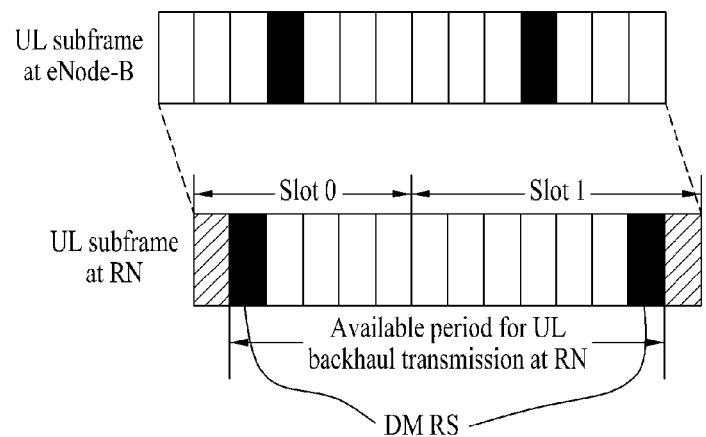

As shown in FIGS. 48 to 51, 52, and 54, the RN may transmit a DM RS to the eNode-B through one arbitrary symbol in each slot. In addition, as shown in FIG. 53, a DM RS may be transmitted to the eNode-B through two arbitrary symbols in one arbitrary slot (e.g., the slot having the index of 1).

Figure 55:
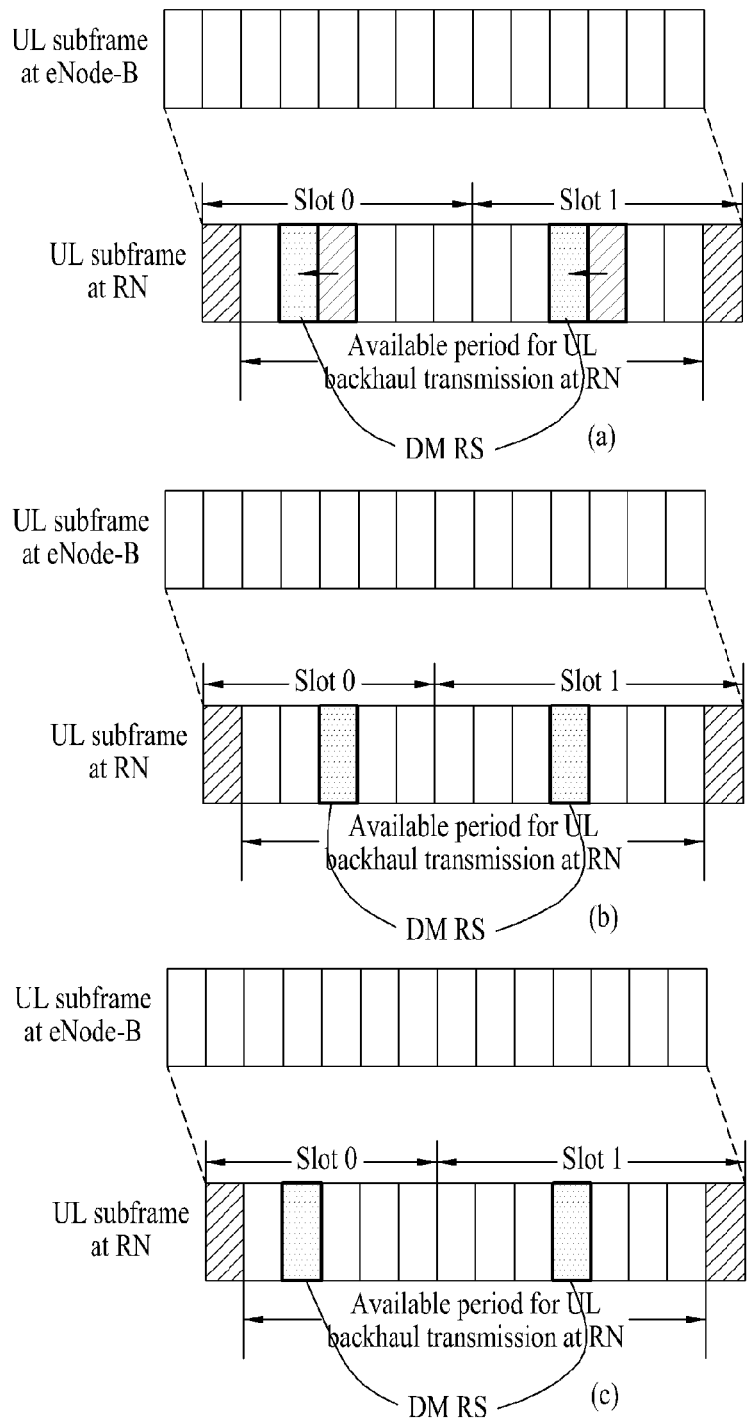
FIG. 55 is a diagram illustrating an example of a transmission format structure for use in a UL backhaul subframe of a relay node (RN)

FIG. 55 is a diagram illustrating an example of a transmission format structure for use in a UL backhaul subframe of a relay node (RN).

Referring to FIGS. 5(*a*) to 5(*c*), a first slot (a slot having an index of 0) and a second slot (a slot having an index of 1) may be evenly configured in a specific UL backhaul subframe of the RN. That is, each of the first and second slots may include 7 symbols.

Referring to FIGS. 55(*a*) to 55(*c*), the RN may transmit a DM RS to the eNode-B using one arbitrary symbol in each slot of a specific UL backhaul subframe.

Figure 56:
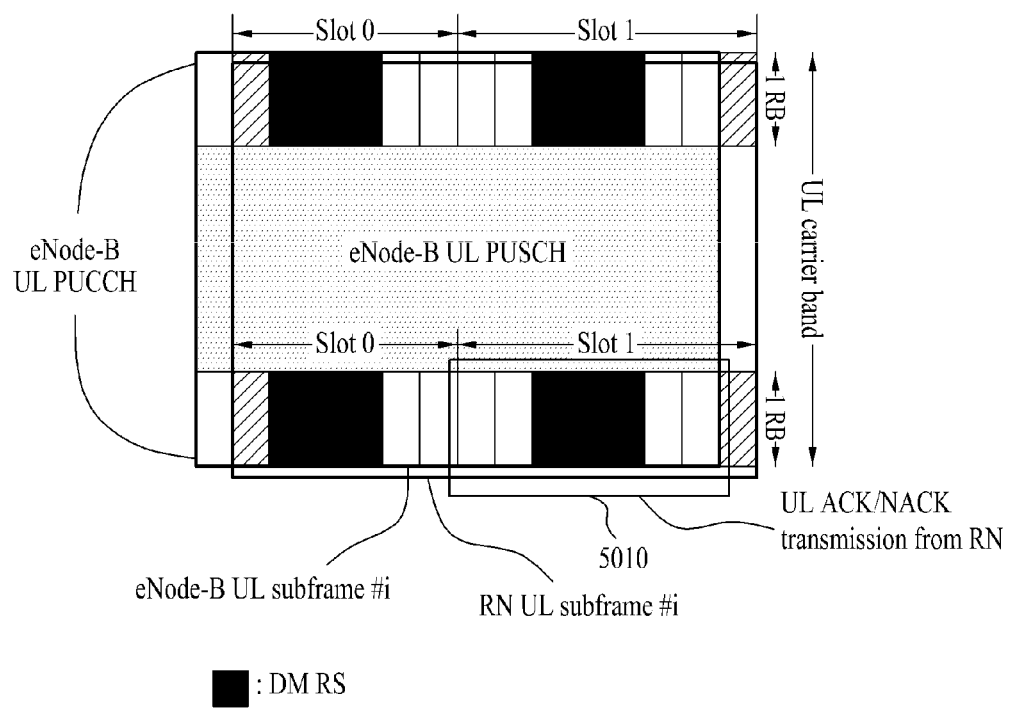
FIGS. 56 to 58 are diagrams illustrating an example of PUCCH/1a/1b transmission format for enabling a relay node (RN) to transmit a DM RS and an ACK/NACK feedback.
Figure 57:
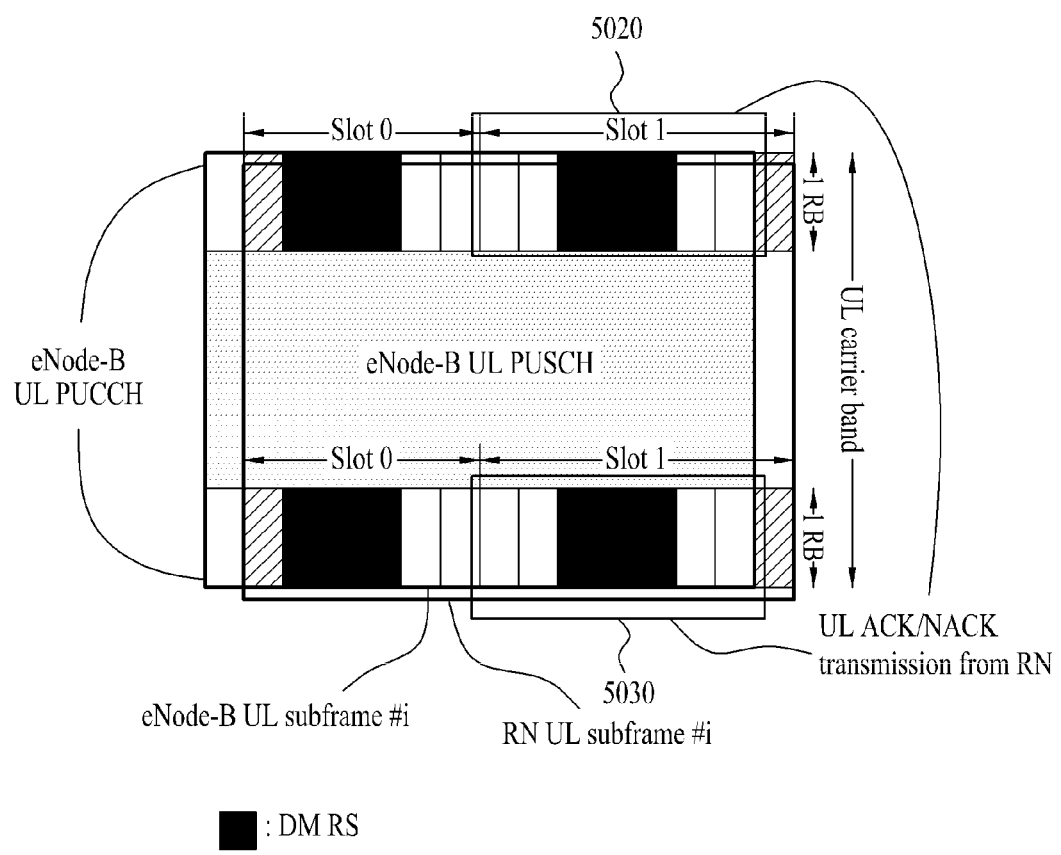
Figure 58:
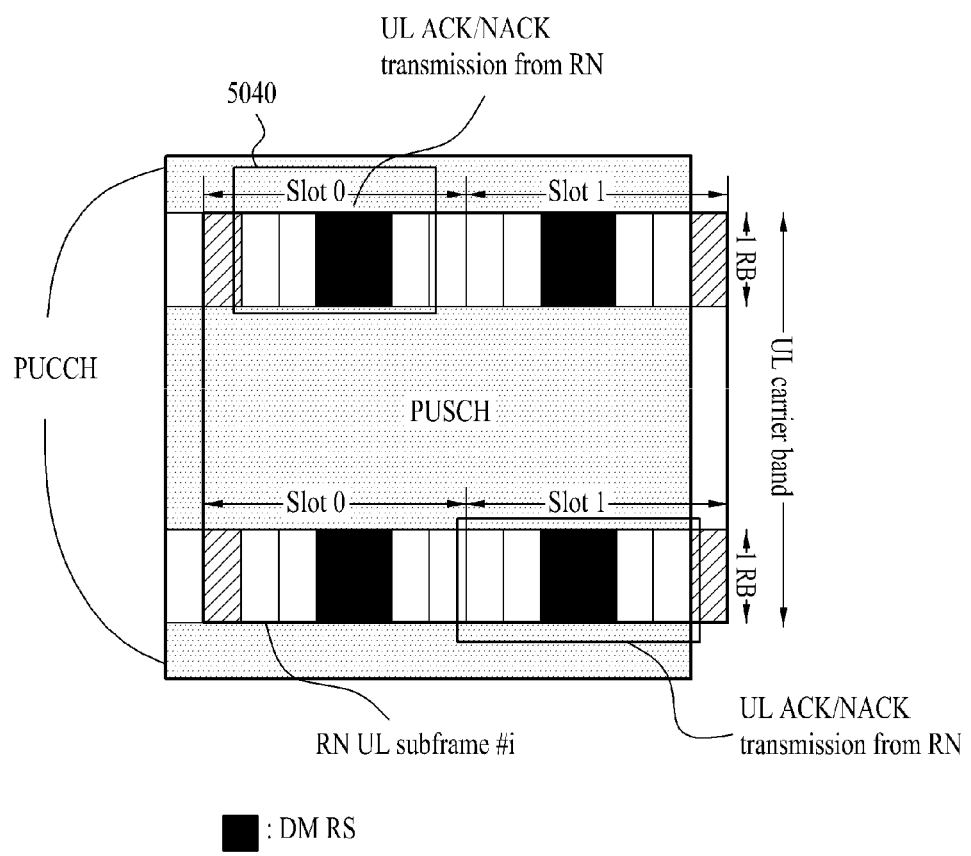

FIGS. 56 to 58 are diagrams illustrating an example of PUCCH/1*a*/1*b* transmission format for enabling a relay node (RN) to transmit a DM RS and an ACK/NACK feedback.

Referring to FIGS. 56 to 58, a Walsh sequence having the length of 4 or a DFR orthogonal sequence having the length of 3 may be applied according to whether SRS is transmitted on a time axis (or time domain) at a UL subframe (i) of the RN. Referring to FIG. 56, the RN may transmit ACK/NACK information to the eNode-B using one resource block (1 RB) in Slot 1 (5010) having the index of 1. In contrast, as shown in FIG. 57, the RN may transmit ACK/NACK information to the eNode-B using one or more RBs (e.g., 2 RBs, namely, RBs located at a boundary within one PRB) in Slot 1 (5020 or 5030). In addition, as shown in FIG. 58, in order to transmit ACK/NACK information to the eNode-B, Slot 0 (5040) having the index of 0 may be additionally allocated to the ACK/NACK channel. Therefore, the RN may transmit ACK/NACK information to the eNode-B using Slot 0 (5040). ACK/NACK signal or information transmitted to each eNode-B may be identified by either a Walsh/DFT orthogonal sequence or a CG (Computer Generated) CAZAC sequence having different cyclic shift values.

Figure 59:
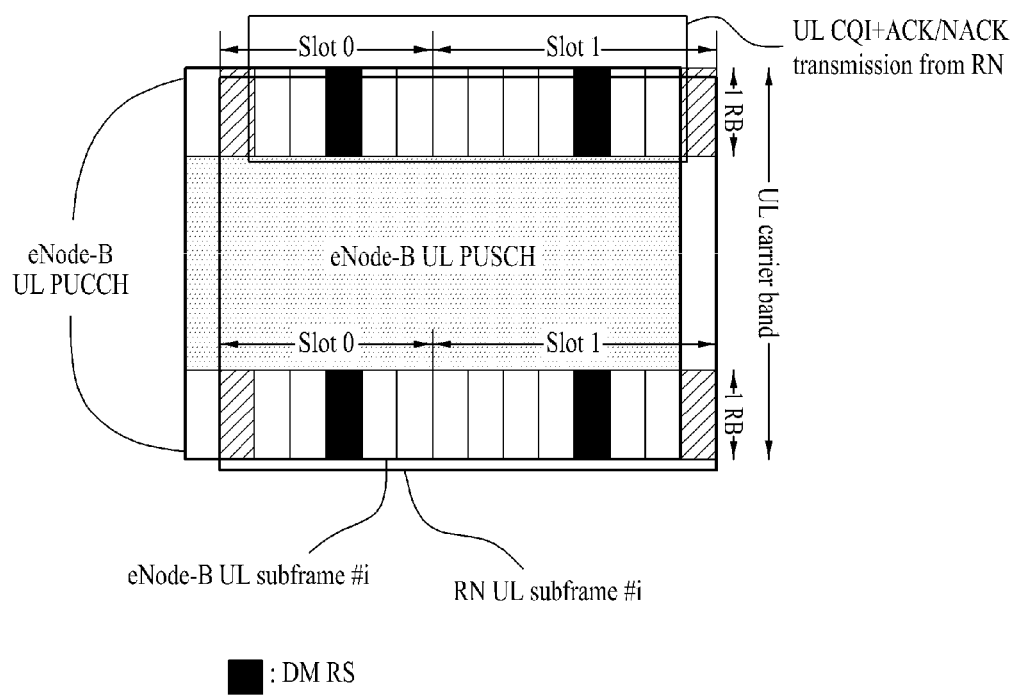
FIGS. 59 to 61 are diagrams illustrating an example of PUCCH 2/2a/2b transmission format for enabling a relay node (RN) to transmit CQI, or CQI and ACK/NACK feedback.
Figure 60:
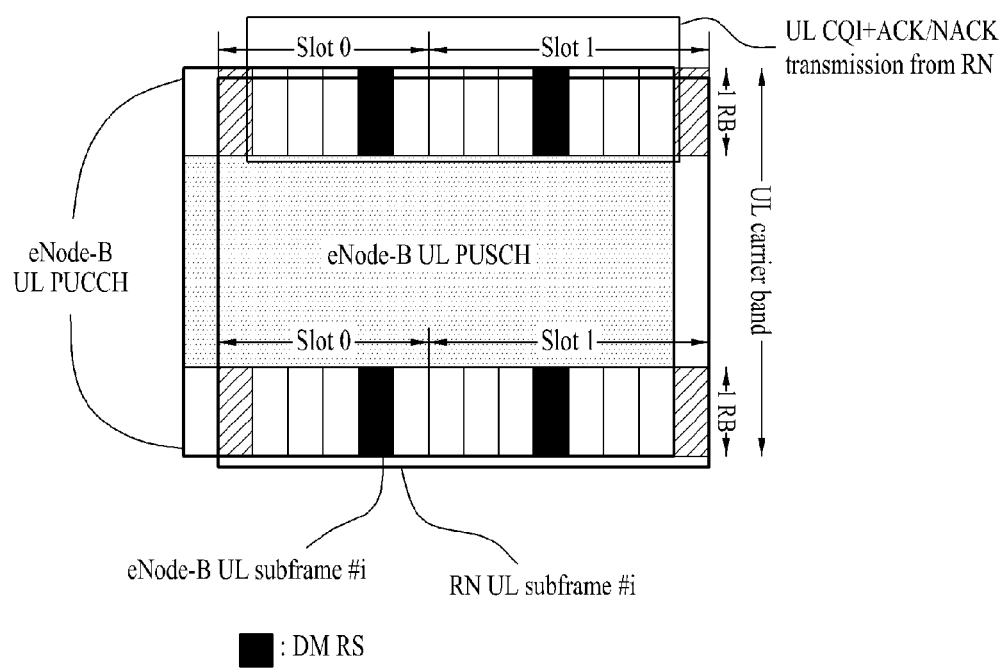
Figure 61:
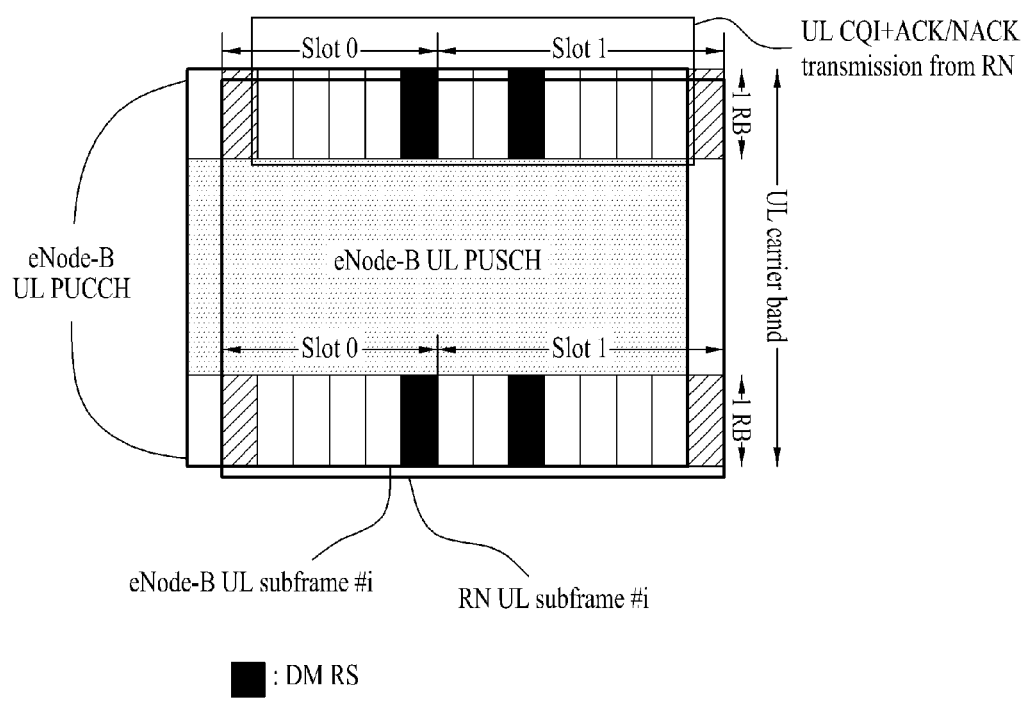

FIGS. 59 to 61 are diagrams illustrating an example of PUCCH 2/2*a*/2*b* transmission format for enabling a relay node (RN) to transmit CQI, or CQI and ACK/NACK feedback.

Referring to FIGS. 59 to 61, in order to transmit a DM RS, the RN may use two symbols (SC-FDMA symbols) within one subframe. In addition, the RN may transmit CQI, or CQI and ACK/NACK feedback in units of a subframe.

FIGS. 62 to 65 are diagrams illustrating an example of PUCCH 2/2*a*/2*b* transmission format for enabling a relay node (RN) to transmit CQI, or CQI and ACK/NACK feedback.

Figure 62:
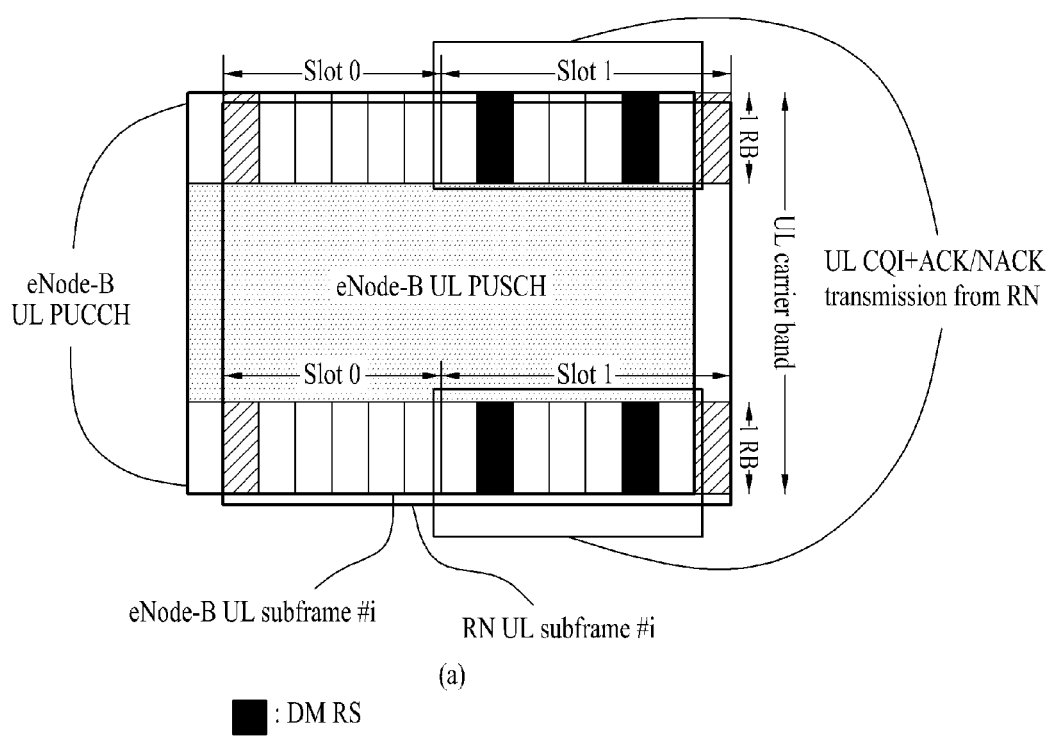
FIGS. 62 to 65 are diagrams illustrating an example of PUCCH 2/2a/2b transmission format for enabling a relay node (RN) to transmit CQI, or CQI and ACK/NACK feedback.
Figure 63:
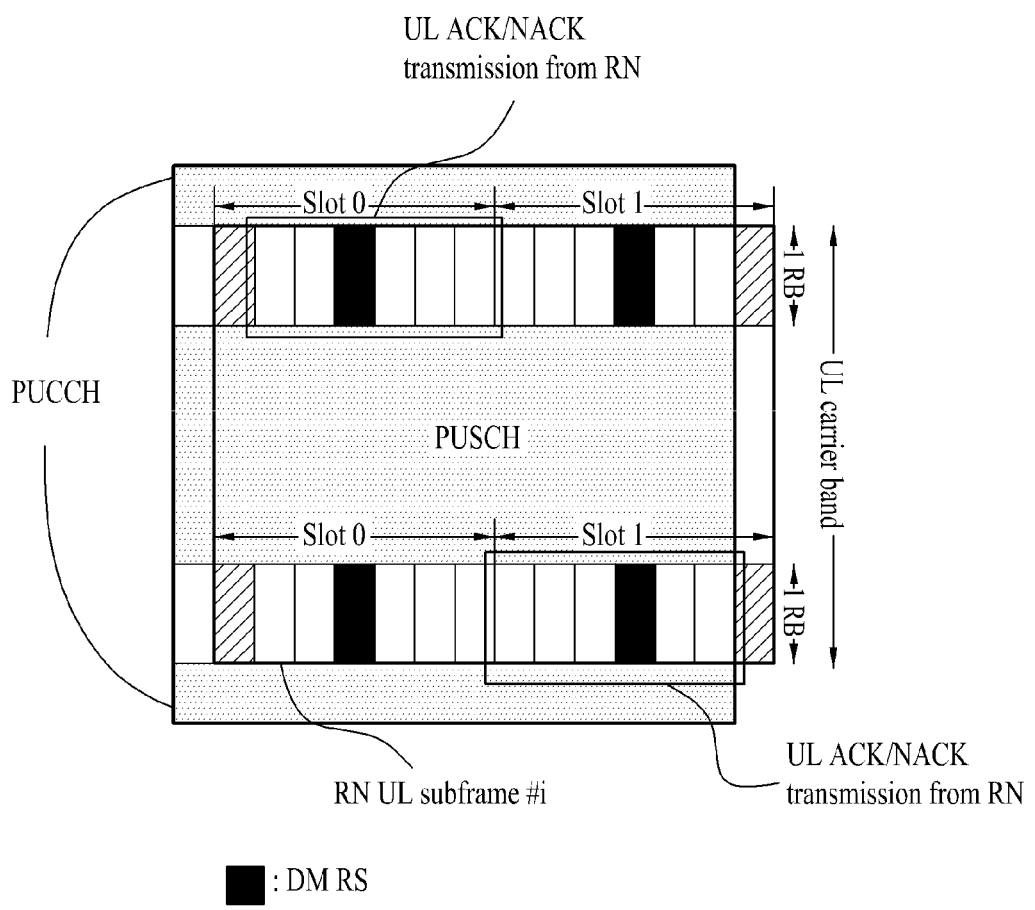
Figure 64:
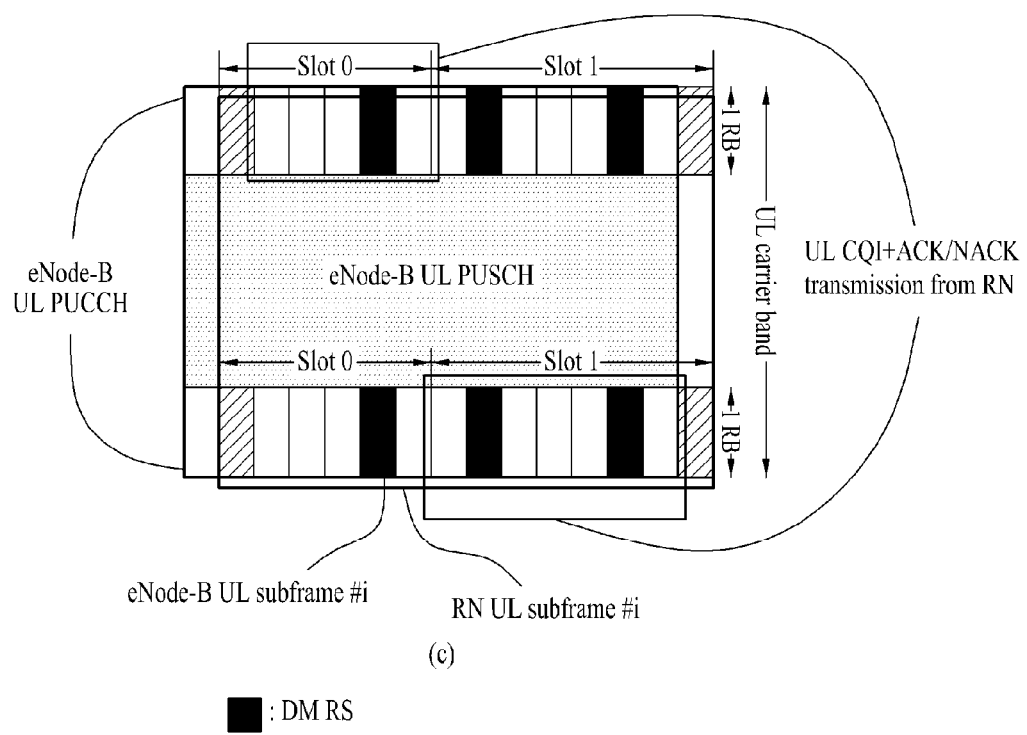
Figure 65:
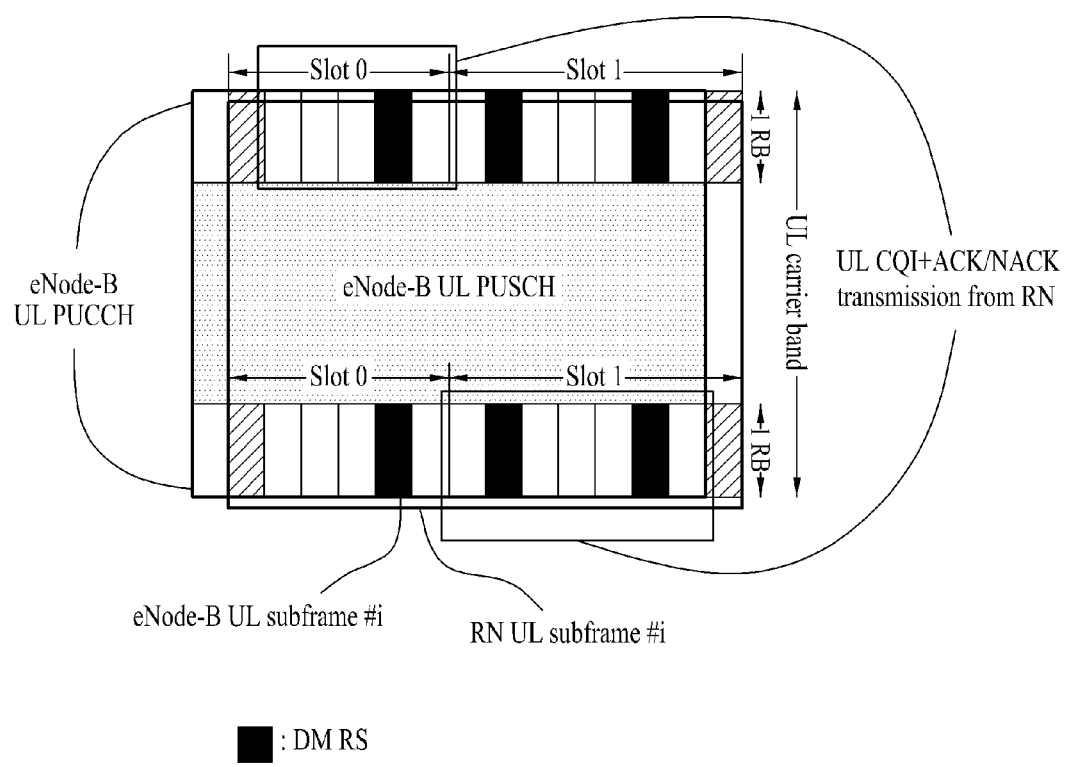

Referring to FIG. 62, the RN may transmit PUCCH format 2/2*a*/2*b* to the eNode-B through Slot 1 having the index of 1 using one or more RBs. In contrast, referring to FIG. 23, at Slot 0 having the index of 0 in a specific subframe, the RN may transmit PUCCH format 2/2*a*/2*b* to the eNode-B through Slot 1 having the index of 1 in other subframes. In this case, the transmitted PUCCH format 2/2*a*/2*b* may be RN-specifically bit-scrambled by a scrambling sequence, such that it can be identified for each RN. Referring to FIG. 64, at Slot 0 having the index of 0 in a specific subframe, the RN may transmit PUCCH format 2/2*a*/2*b* to the eNode-B through Slot 1 having the index of 1 in other specific subframes. One data symbol and one DM RS may be punctured. Specifically, the first two OFDM symbols may be punctured. Referring to FIG. 65, the RN may encode CQI, or CI and ACK/NACK information into a new (18,A) simplex code using the modulation scheme, and may then transmit the encoded result. One data symbol and one DM RS may be punctured. Specifically, the initial two OFDM symbols may be punctured.

Figure 66:
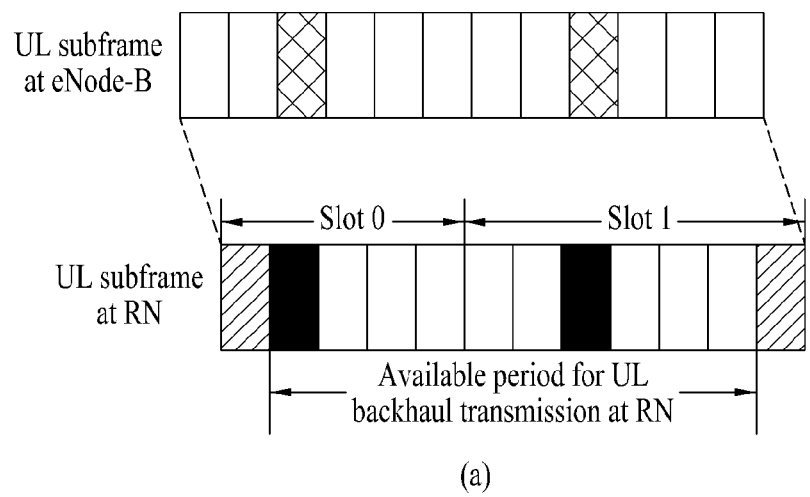
FIGS. 66 to 68 are diagrams illustrating an example of timing shifting at a UL subframe of a relay node (RN) in case of using an extended CP.
Figure 66:
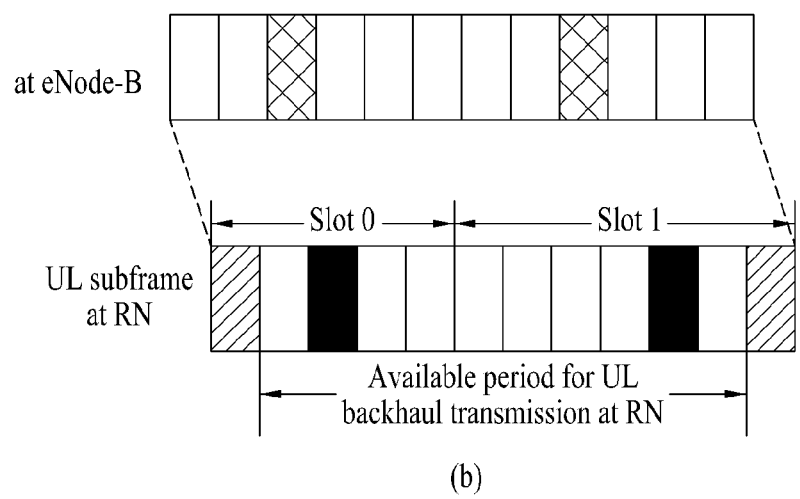
Figure 67:
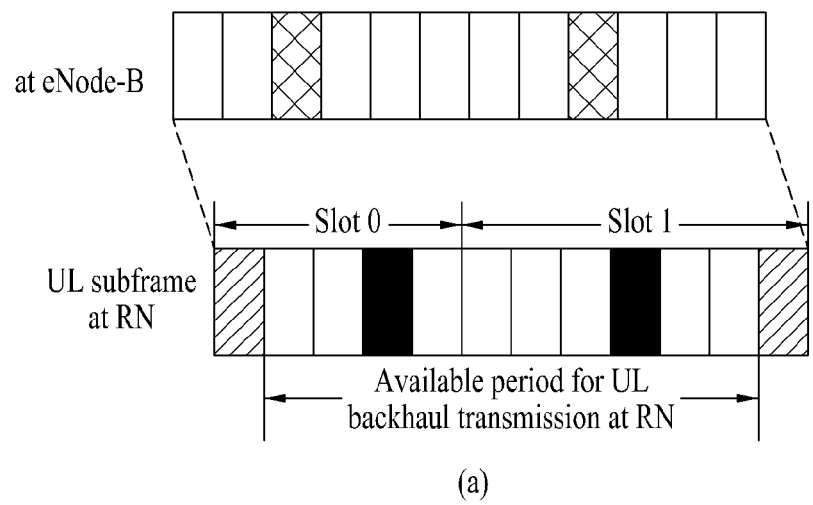
Figure 67:
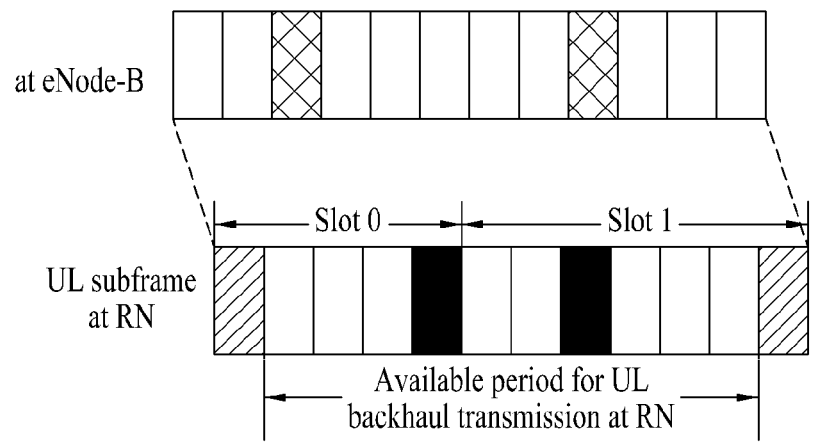
Figure 68:
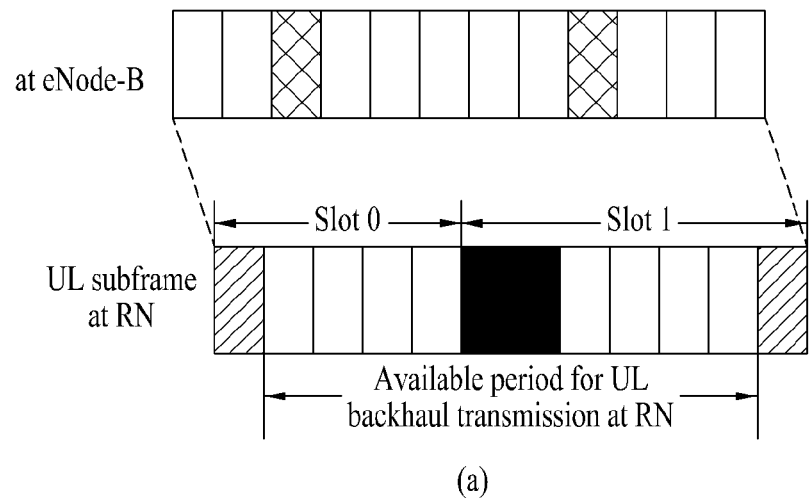
Figure 68:
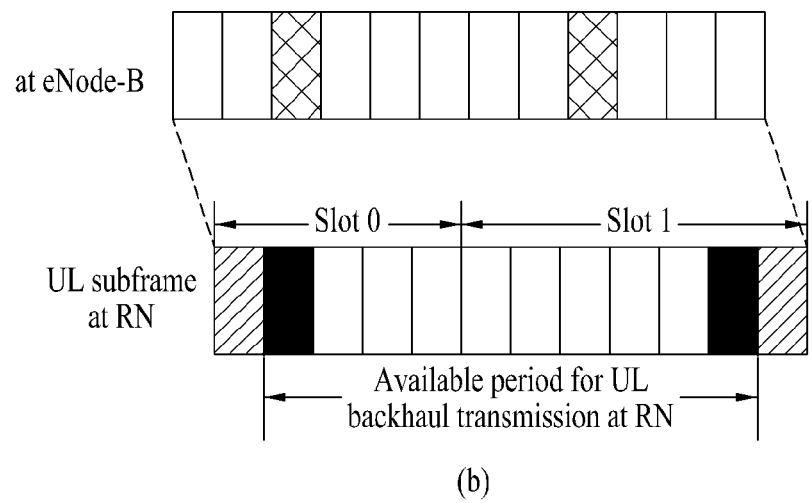

FIGS. 66 to 68 are diagrams illustrating an example of timing shifting at a UL subframe of a relay node (RN) in case of using an extended CP.

In the case of using the extended CP in the same manner as in the case of using the normal CP, a UL radio frame for use in a relay node (RN) may be compared with a UL radio frame of the eNode-B, so that it is shifted by a predetermined distance corresponding to one OFDM symbol.

Referring to FIGS. 66 to 68, a first slot (a slot having an index of 0) and a second slot (a slot having an index of 1) may be unevenly configured in a specific UL backhaul subframe of the RN. That is, the slot having the index of 0 may include 6 symbols, and the slot having the index of 1 may include 8 symbols. In addition, an uneven slot for UL backhaul transmission having uneven DM RS positioning in PUSCH is shown in FIGS. 66 to 68.

Referring to FIGS. 66 and 67, the RN may transmit a DM RS to the eNode-B using one arbitrary symbol at every slot contained in a specific UL backhaul subframe. Referring to FIG. 68(*b*), the RN may transmit a DM RS to the eNode-B using one arbitrary symbol at every slot contained in a specific UL backhaul subframe. In contrast, as shown in FIG. 68(*a*), the RN may transmit a DM RS to the eNode-B using two arbitrary symbols in a specific slot contained in a specific UL backhaul subframe.

In the structure shown in FIG. 68, the RN may transmit a DM RS to the eNode-B through only one OFDM symbols from among 10 available OFDM symbols.

Until now, not only according to UL subframe timing types of the RN and UL subframe timing types of the eNode-B (for example, according to aligning, delaying, and advancing), but also according to the case of using the normal CP or the case of using the extended CP, examples of the PUCCH transmission format or examples of the R-PUCCH transmission format have been disclosed in the foregoing description. Although examples of PUCCH transmission format or R-PUCCH transmission format are disclosed as preferred examples in the above-mentioned parts, the scope or spirit of the present invention is not limited thereto. For example, if UL subframe timing of the RN leads UL subframe timing of the eNode-B, the above-mentioned examples of PUCCH transmission format and R-PUCCH transmission format may also be applied to the other case in which UL subframe timing of the RN lags UL subframe timing of the eNode-B. In addition, examples of PUCCH transmission format or R-PUCCH transmission format in the case of using the normal CP may also be applied to the extended CP.

Figure 69:
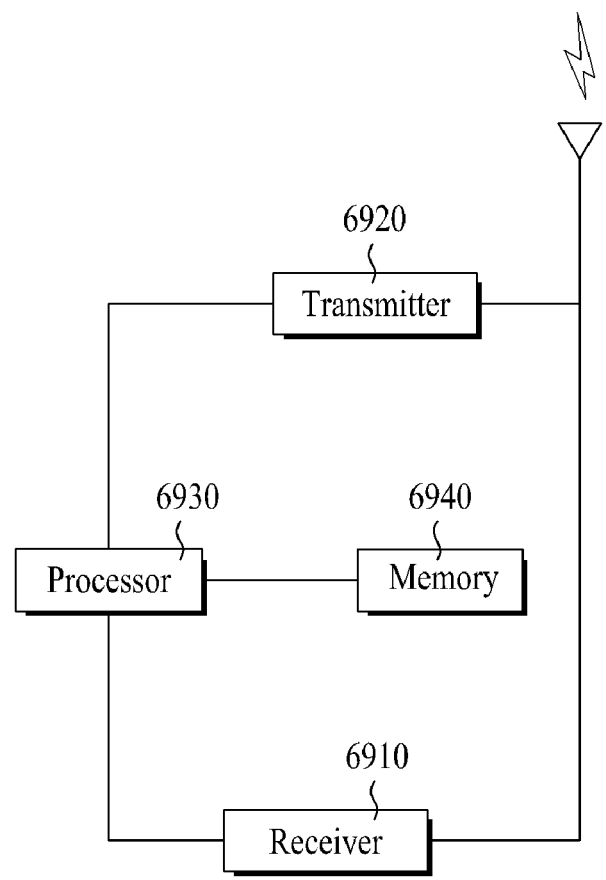
FIG. 69 is a diagram illustrating a relay node (RN) according to an embodiment of the present invention.

FIG. 69 is a diagram illustrating a relay node (RN) according to an embodiment of the present invention.

Referring to FIG. 69, the RN may include a receiver 6910, a transmitter 6920, a processor 6930, and a memory unit 6940.

The receiver 6910 may receive resource allocation information and sequence information in response to a predetermined physical uplink control channel (PUCCH) transmission format from the eNode-B. The transmitter 6920 may transmit UL control information, to which a sequence corresponding to the received sequence information is applied, to the eNode-B through a predetermined number of symbols in one or more slots of a resource region indicated by the received resource allocation information.

The RN may include at least one microprocessor, at least one microcontroller, at least one digital signal processor (DSP), and a combination thereof, or a processor 6930 such as devices well known to those skilled in the art. Detailed operations/functions of the RN may be determined by software commands and routines stored in at least one memory 6940 associated with the processor 6930. The memory unit 6940 stores data and programs capable of being executed by the processor 6930. For example, the memory unit 6940 may be any of a random access memory (RAM), a dynamic random access memory (DRAM), and/or read only memory (ROM), or their equivalents.

The embodiments of the present invention can be implemented by hardware, firmware, software, or any combination thereof. In the case where the present invention is implemented by hardware, the method for transmitting UL control information according to one embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The method for transmitting UL control information of the RN according to the present invention can be applied to wireless communication systems such as IEEE 802.16m system, 3GPP LTE system, and the like.

The invention claimed is:

1. A method for transmitting uplink control information at a relay node (RN) in a wireless communication system, the method comprising:
   receiving resource allocation information and sequence information in accordance with a predetermined physical uplink control channel (PUCCH) transmission format from an eNode-B; and
   transmitting the uplink control information, to which a sequence corresponding to the received sequence information is applied, to the eNode-B through a predetermined number of symbols in at least one slot from among a resource region indicated by the received resource allocation information;
   wherein the predetermined physical uplink control channel (PUCCH) transmission format includes:
      a first transmission format for transmitting ACK/NACK information indicating success or failure of reception of a codeword received from the eNode-B;
      a second transmission format for transmitting channel quality information (CQI) indicating a channel quality state; and
      a third transmission format for transmitting a scheduling request (SR) signal;
      wherein the third transmission format reuses the first transmission format.

2. The method according to claim 1, wherein the predetermined physical uplink control channel (PUCCH) is a physical uplink control channel (PUCCH) used between a user equipment (UE) and the eNode-B or a relay-physical uplink control channel (R-PUCCH).

3. The method according to claim 1, wherein the resource allocation information for the physical uplink control channel (PUCCH) includes at least one of a resource block (RB) index and a slot hopping pattern.

4. The method according to claim 1, wherein the uplink control information includes at least one of ACK/NACK information, channel quality information (CQI) and scheduling request (SR) information, and a demodulation reference signal (DM RS) needed for demodulating the uplink control information.

5. The method according to claim 4, wherein a sequence of the demodulation reference signal (DM RS) is identified by different orthogonal sequences of individual relay nodes (RNs).

6. The method according to claim 4, wherein, on a time axis in a resource region to which the uplink control information is transmitted, the demodulation reference signal (DM RS) is orthogonal-code-covering-processed with the ACK/NACK information and the CQI such that it is identified.

7. The method according to claim 1, further comprising:
   receiving information regarding a modulation scheme to be applied for transmission of the uplink control information from the eNode-B.

8. A relay node (RN) for transmitting uplink control information in a wireless communication system, the RN comprising:
   a receiver for receiving resource allocation information and sequence information in accordance with a predetermined physical uplink control channel (PUCCH) transmission format from an eNode-B; and
   a transmitter for transmitting the uplink control information, to which a sequence corresponding to the received sequence information is applied, to the eNode-B through a predetermined number of symbols in at least one slot from among a resource region indicated by the received resource allocation information;
   wherein the predetermined physical uplink control channel (PUCCH) transmission format includes:
      a first transmission format for transmitting ACK/NACK information indicating success or failure of reception of a codeword received from the eNode-B;
      a second transmission format for transmitting channel quality information (CQI) indicating a channel quality state; and
      a third transmission format for transmitting a scheduling request (SR) signal;
      wherein the third transmission format reuses the first transmission format.

9. The relay node (RN) according to claim 8, wherein the predetermined physical uplink control channel (PUCCH) is a physical uplink control channel (PUCCH) used between a user equipment (UE) and the eNode-B or a relay-physical uplink control channel (R-PUCCH).

10. The relay node (RN) according to claim 8, wherein the resource allocation information for the physical uplink control channel (PUCCH) includes at least one of a resource block (RB) index and a slot hopping pattern.

11. The relay node (RN) according to claim 8, wherein the uplink control information includes at least one of ACK/NACK information, channel quality information (CQI), and scheduling request (SR) information, and also includes a demodulation reference signal (DM RS) needed for demodulating the uplink control information.

12. The relay node (RN) according to claim 11, wherein a sequence of the demodulation reference signal (DM RS) is identified by different orthogonal sequences of individual relay nodes (RNs).

\* \* \* \* \*